United States Patent
Almanza-Workman et al.

(10) Patent No.: US 12,468,178 B2
(45) Date of Patent: Nov. 11, 2025

(54) OPHTHALMIC LENS ASSEMBLY

(71) Applicant: Amazon Technologies, Inc., Seattle, WA (US)

(72) Inventors: Angeles Marcia Almanza-Workman, Sunnyvale, CA (US); Jon H. Appleby, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 767 days.

(21) Appl. No.: 17/488,887

(22) Filed: Sep. 29, 2021

(65) Prior Publication Data
US 2023/0094153 A1 Mar. 30, 2023

(51) Int. Cl.
*A61B 3/00* (2006.01)
*B33Y 80/00* (2015.01)
(Continued)

(52) U.S. Cl.
CPC .............. *G02C 7/027* (2013.01); *B33Y 80/00* (2014.12); *G02B 27/0101* (2013.01); *G02B 27/0172* (2013.01); *G06T 19/006* (2013.01); *G02B 2027/0152* (2013.01); *G02B 2027/0174* (2013.01); *G02B 2027/0178* (2013.01); *G02C 7/101* (2013.01); *G02C 2202/06* (2013.01); *G02C 2202/16* (2013.01); *G02C 2202/24* (2013.01)

(58) Field of Classification Search
CPC ................ B33Y 80/00; G02B 27/0101; G02B 27/0172; G02B 2027/0152; G02B 2027/0174; G02B 2027/0178; G02C 7/027; G02C 7/101; G02C 2202/06; G02C 2202/16; G02C 2202/24; G06T 19/006

USPC ............... 351/159.52–159.54, 159.6–159.65, 351/159.74–159.81; 359/629–640
See application file for complete search history.

(56) References Cited

U.S. PATENT DOCUMENTS

| 4,679,918 A | 7/1987 | Ace |
| 10,994,474 B2 | 5/2021 | Van De Vrie et al. |

(Continued)

FOREIGN PATENT DOCUMENTS

| EP | 3754388 A1 | 12/2020 | |
| WO | WO-2019038374 A1 * | 2/2019 | ......... G02B 27/0172 |
| WO | 2020254631 A1 | 12/2020 | |

OTHER PUBLICATIONS

WO Application No. PCT/US2022/044070, "International Search Report and the Written Opinion," mailed Jan. 5, 2023, 11 pages.

*Primary Examiner* — Mahidere S Sahle
(74) *Attorney, Agent, or Firm* — Kilpatrick Townsend & Stockton LLP

(57) ABSTRACT

Light weight ophthalmic lenses include a curved back lens attached to a curved front lens assembly having a functional element. An ophthalmic lens includes a curved front lens assembly and a curved back lens. The curved front lens assembly has an essentially constant thickness, forms an external world-side convex surface of the ophthalmic lens, and includes a functional element operable to modify an image of a real world scene viewed via the ophthalmic lens. The curved back lens forms an external user-side surface of the ophthalmic lens, has a world-side convex surface that is shaped complementary to and interfaced with the front lens assembly, and provides a prescribed vision correction.

16 Claims, 19 Drawing Sheets

(51) Int. Cl.
*G02B 27/01* (2006.01)
*G02C 3/00* (2006.01)
*G02C 7/00* (2006.01)
*G02C 7/02* (2006.01)
*G06T 19/00* (2011.01)
*G02C 7/10* (2006.01)

(56) References Cited

U.S. PATENT DOCUMENTS

| | | | |
|---|---|---|---|
| 2013/0027655 | A1 | 1/2013 | Blum et al. |
| 2015/0121611 | A1* | 5/2015 | Isabelle .................. G02C 7/022 |
| | | | 428/156 |
| 2017/0010465 | A1* | 1/2017 | Martinez ................ G02C 11/10 |
| 2017/0235203 | A1 | 8/2017 | Yamamoto et al. |
| 2018/0084232 | A1* | 3/2018 | Belenkii .............. H04N 9/3105 |
| 2019/0121164 | A1* | 4/2019 | Grasso ................... G02C 7/108 |
| 2019/0235282 | A1* | 8/2019 | Coppa .............. B29D 11/00634 |
| 2021/0247628 | A1 | 8/2021 | Guillou et al. |
| 2021/0341740 | A1* | 11/2021 | Cakmakci .......... G02B 27/0025 |
| 2022/0244542 | A1* | 8/2022 | Bouchier ........... G02B 27/0172 |

* cited by examiner

OPHTHALMIC LENS ASSEMBLY

BACKGROUND

Augmented reality glasses are used to overlay virtual image content on a real world scene viewed through the augmented reality glasses. To accommodate use of augmented reality glasses over an extended time period, the comfort of the augmented reality glasses is an important factor. Lens weight is an important parameter in the amount of force applied to the nose. Prolonged application of too much force on the nose can cause discomfort.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, light weight ophthalmic high impact resistance lenses with functional elements. In many embodiments, an ophthalmic lens includes a curved front lens assembly and a curved back lens printed on the curved front lens assembly from a transparent material. In many embodiments, the curved back lens is shaped to provide a prescribed vision correction. The curved front lens assembly can include any suitable functional element. For example, in many embodiments, the functional element is a curved augmented reality combiner configured for overlaying virtual image content on a real world scene viewed through the ophthalmic lens. As another example, the functional element can be a polarized film. As yet another example, the functional element can be configured to change tint in response to change in light level. In many embodiments, the weight of the ophthalmic lens is reduced relative to a comparable known ophthalmic lens, thereby increasing comfort of glasses that employ the ophthalmic lens.

Figure 1:
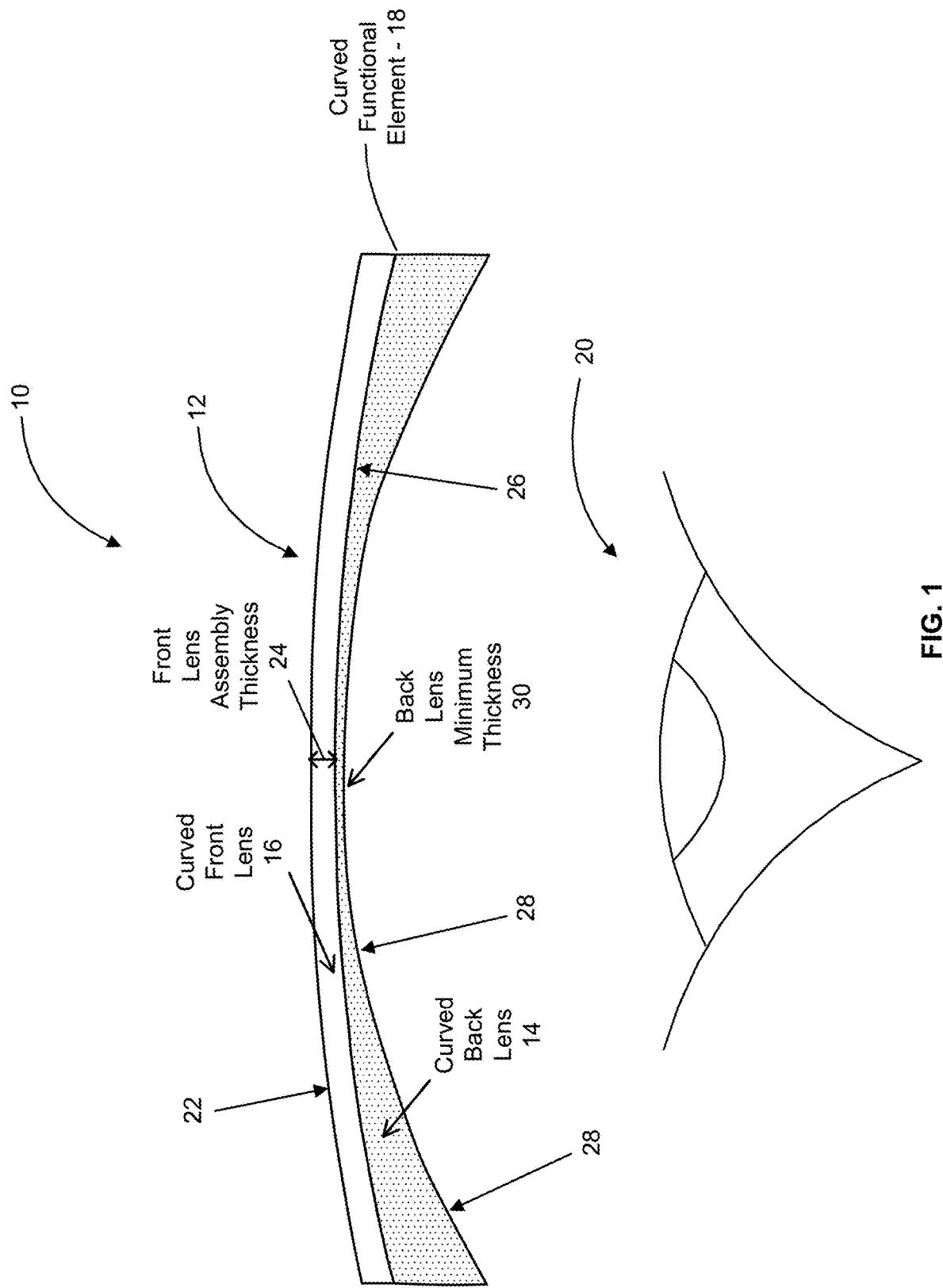
FIG. 1 illustrates an ophthalmic lens including a curved back lens that provides a prescribed vision correction attached to a curved front lens assembly with a curved functional element, in accordance with embodiments.

FIG. 1 illustrates an ophthalmic lens 10 in accordance with an embodiment of the present disclosure. As illustrated in FIG. 1, the ophthalmic lens 10 includes a high impact resistance curved front lens assembly 12 and a curved back lens 14. In the illustrated embodiment, the curved front lens assembly 12 includes a curved front lens 16 and a curved functional element 18. In FIG. 1, the ophthalmic lens 10 is shown in a use position and orientation relative to a user's eye 20. In many embodiments, the ophthalmic lens 10 is mounted to a suitable head-worn mount (e.g., glass frame, google, helmet, etc.) that holds the ophthalmic lens 10 in the use position and orientation relative to the user's eye 20 when worn by the user.

The curved front lens assembly 12 forms an external world-side convex surface 22 of the ophthalmic lens 10. As used herein, the external world-wide convex surface 22 is the external surface of the ophthalmic lens 10 that faces outwardly away from the user's eye 20 when the ophthalmic lens 10 in the use position and orientation relative to the user's eye 20.

In many embodiments, the curved front lens assembly 12 has an essentially constant thickness 24. The thickness 24 is the distance between the external world-side convex surface 22 and a user-side concave surface 26 of the curved front lens assembly 12. In some embodiments, the curved front lens assembly 12 has a perimeter edge with a tapered thickness that is less than a constant thickness of the rest of the curved front lens assembly 12. Accordingly, in embodiments in which the curved front lens assembly 12 has a perimeter edge with a tapered thickness, the thickness 24 is described herein as being essentially constant due the main portion of the curved front lens assembly 12 having the constant thickness 24.

In many embodiments, the curved front lens assembly 12 provides essentially zero vision correction. For example, in many embodiments, the curved front lens assembly 12 is configured as a Plano lens, which provides no vision correction.

In many embodiments, the curved front lens assembly 12 does not include a lens that provide any significant vision correction. For example, in many embodiments the curved front lens assembly 12 consists essentially of the curved front lens 16 and the curved functional element 18, which can be separately formed or the curved front lens 16 and the curved functional element 18 can be part of a single front panel in which the curved front lens 16 is configured to provide the functionality of the curved functional element 18.

The external world-side convex surface 22 can have any suitable convex shape including, but not limited to, cylindrical, spherical, aspherical, axial symmetric, non-axial symmetric shapes. In many embodiments, the external world-side convex surface 22 has a radius of curvature(s) of less than 300 mm.

In many embodiments, the curved functional element 18 is operable to modify an image of a real world scene viewed via the ophthalmic lens 10. For example, the curved functional element 18 can be operable to vary a tint of the functional element 18, thereby varying the intensity of light incident on the curved functional element 18 that reaches the user's eye 20. In another example, the curved functional element 18 includes a curved augmented reality combiner configured for overlaying virtual image content on a real world scene viewed via the ophthalmic lens 10.

In some embodiments, the curved back lens 14 is formed on or attached to the user-side concave surface 26 of the curved front lens assembly 12. As used herein, the user-side concave surface 26 of the curved front lens assembly 12 faces the user's eye 20 when the ophthalmic lens 10 in the use position and orientation relative to the user's eye 20.

The curved back lens 14 forms an external user-side surface 28 of the ophthalmic lens 10. As used herein, the external user-side surface 28 of the ophthalmic lens 10 faces the user's eye 20 when the ophthalmic lens 10 in the use position and orientation relative to the user's eye 20.

Figure 2:
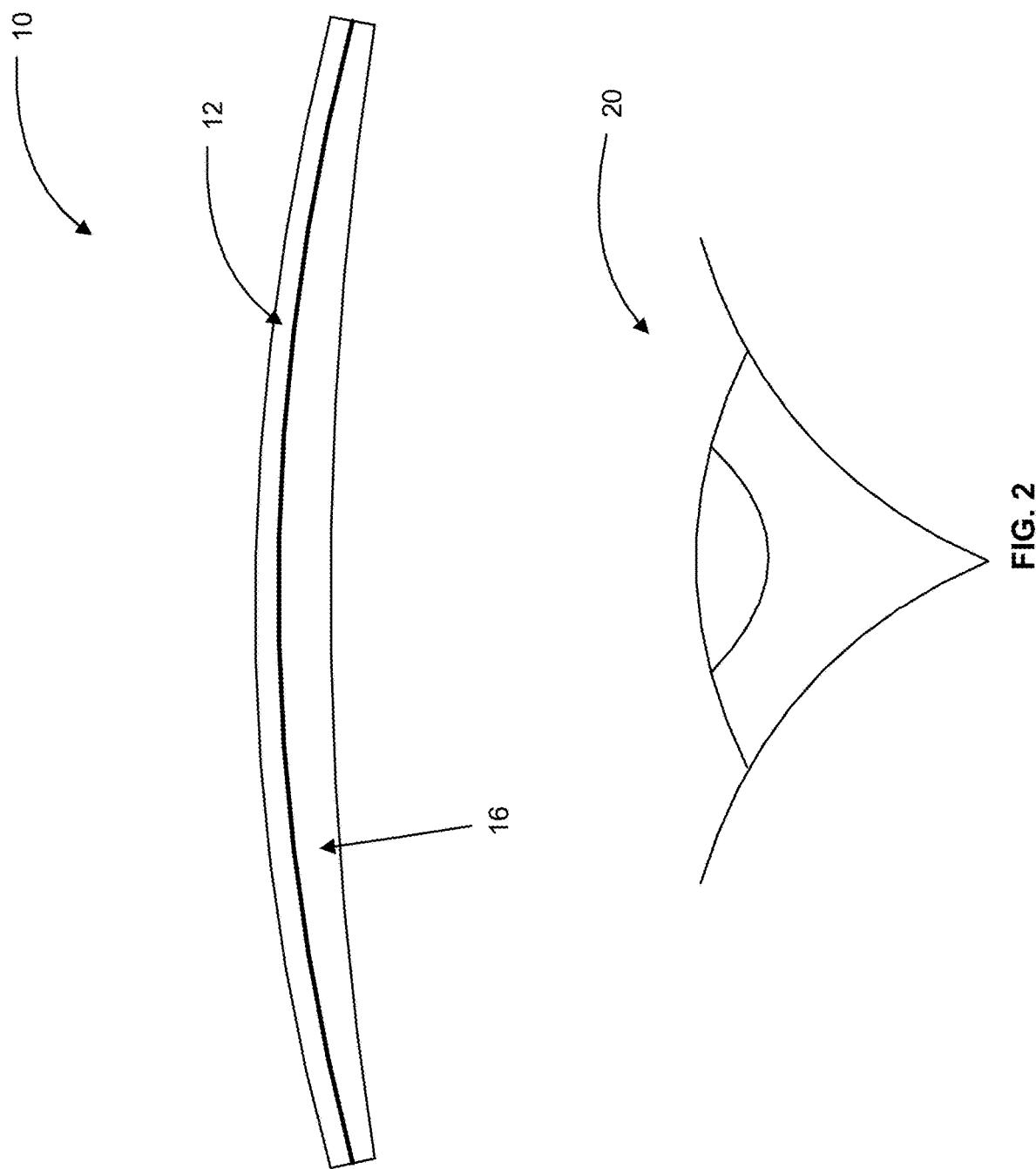
FIG. 2 illustrates an example of the ophthalmic lens of FIG. 1 with a curved back lens that provides a prescribed vision correction that includes a positive diopter correction for correcting hyperopia, in accordance with embodiments.

In many embodiments, the curved back lens 14 is configured (e.g., shaped) to provide a prescribed vision correction for a user of the ophthalmic lens 10. In the configuration illustrated in FIG. 1, the curved back lens 14 is configured as a negative meniscus lens that provides a vision correction that includes a negative diopter vision correction for myopia. In the configuration illustrated in FIG. 2, the curved back lens 14 is configured as a positive meniscus lens that provides vision correction that includes a positive diopter vision correction for hyperopia.

The curved front lens assembly 12 can have any suitable configuration. For example, the curved front lens 16 can be made from any suitable lens material and have any suitable thickness. In preferred embodiments, the curved front lens 16 is made from a lens material that has high impact resistance properties so that the thickness of the curved front lens 16 can be low (e.g., 0.8 mm to 1.0 mm) while the curved front lens 16 provides an impact resistance that satisfies applicable impact resistance standards (e.g., American National Standards Institute (ANSI) Testing Standard for Safety Eyewear). As one example, the curved front lens 16 can be formed by molding a suitable polycarbonate lens material so as to have a suitable thickness distribution (e.g., a constant thickness in a range of 0.8 mm to 1.0 mm). As another example, the curved front lens 16 can be formed by casting a suitable urethane-based monomer (a.k.a., Trivex) so as to have a suitable thickness distribution (e.g., a constant thickness in a range of 0.8 mm to 1.0 mm). The curved functional element 18 can be embedded in the curved front lens 16 or attached to the curved front lens 16 using any suitable approach (e.g., molding, casting, laminating).

The curved back lens 14 can be formed on or attached to the curved front lens assembly 12 using any suitable approach. For example, in many embodiments, the curved back lens 14 is directly printed onto the user-side concave surface 26 of the curved front lens assembly 12 using a suitable three dimensional printing process. The curved front lens assembly 12 can be held stationary using a suitable tooling fixture during the three dimensional printing formation of the curved back lens 14 on the curved front lens assembly 12. Alternatively, the curved back lens 14 can be separately formed and then attached to the curved front lens assembly 12 using a suitable approach. For example, the curved back lens 14 can be molded from a suitable material. In some embodiments, the molded material is cured using ultraviolet light. As another example, the curved back lens 14 can be produced from a suitable lens blank using mechanical grinding and polishing.

The curved back lens 14 can have any suitable configuration that provides a suitable vision correction. For example, in the embodiment illustrated in FIG. 1, the curved back lens 14 is configured as a negative meniscus lens that provides a vision correction that includes a negative diopter vision correction for correction of myopia. In the embodiment illustrated in FIG. 1, the curved back lens 14 has a thickness 20 in a centralized zone of the curved back lens 14 that is selected to minimize the weight of the curved back lens 14 while providing a selected minimum impact resistance for the curved back lens 14 at the minimum thickness location. For example, in some embodiments, the thickness 30 is in a range of 0.2 mm to 0.25 mm and the curved back lens 14 is formed with a ultraviolet curable acrylic material. As another example, the curved back lens 14 can be configured as a positive meniscus lens that provides a vision correction that includes a positive diopter vision correction for hyperopia.

The external world-wide convex surface 22 of the curved front lens assembly 12 can have any suitable predetermined world-side surface base curvature. In many instances, the world-side surface base curvature is specified herein in units of diopter (D). The radius of curvature (ROC) of the external world-side convex surface 22 in millimeters can be calculated from the world-side base curvature in units of diopter (D) and the index of refraction of the lens (Nd) using Equation (1).

$$ROC = \frac{(Nd - 1.0) \times 1000}{D} \qquad \text{(Equation 1)}$$

In many embodiments, the curved front lens assembly 12 is configured as a constant thickness meniscus lens that produces a small vision correction primarily due to the thickness of the curved front lens 16. The small vision correction provided by the curved front lens assembly 12 can be accounted for in the configuration of the curved back lens 14 so that the combination of the curved front lens assembly 12 and the curved back lens 14 results in the ophthalmic lens 10 being configured to provide a prescribed refractive optical correction for a particular user. The curved back lens 14 can be shaped using known approaches to provide any one of a wide variety of vision corrections for optical aberrations of an eye including, but not limited to, lower order vision correction(s) for lower order optical aberrations (e.g., myopia, hyperopia, astigmatism) and/or higher order vision correction(s) for higher order optical aberrations (e.g., coma aberrations, trefoil aberrations, spherical aberrations).

Figure 3:
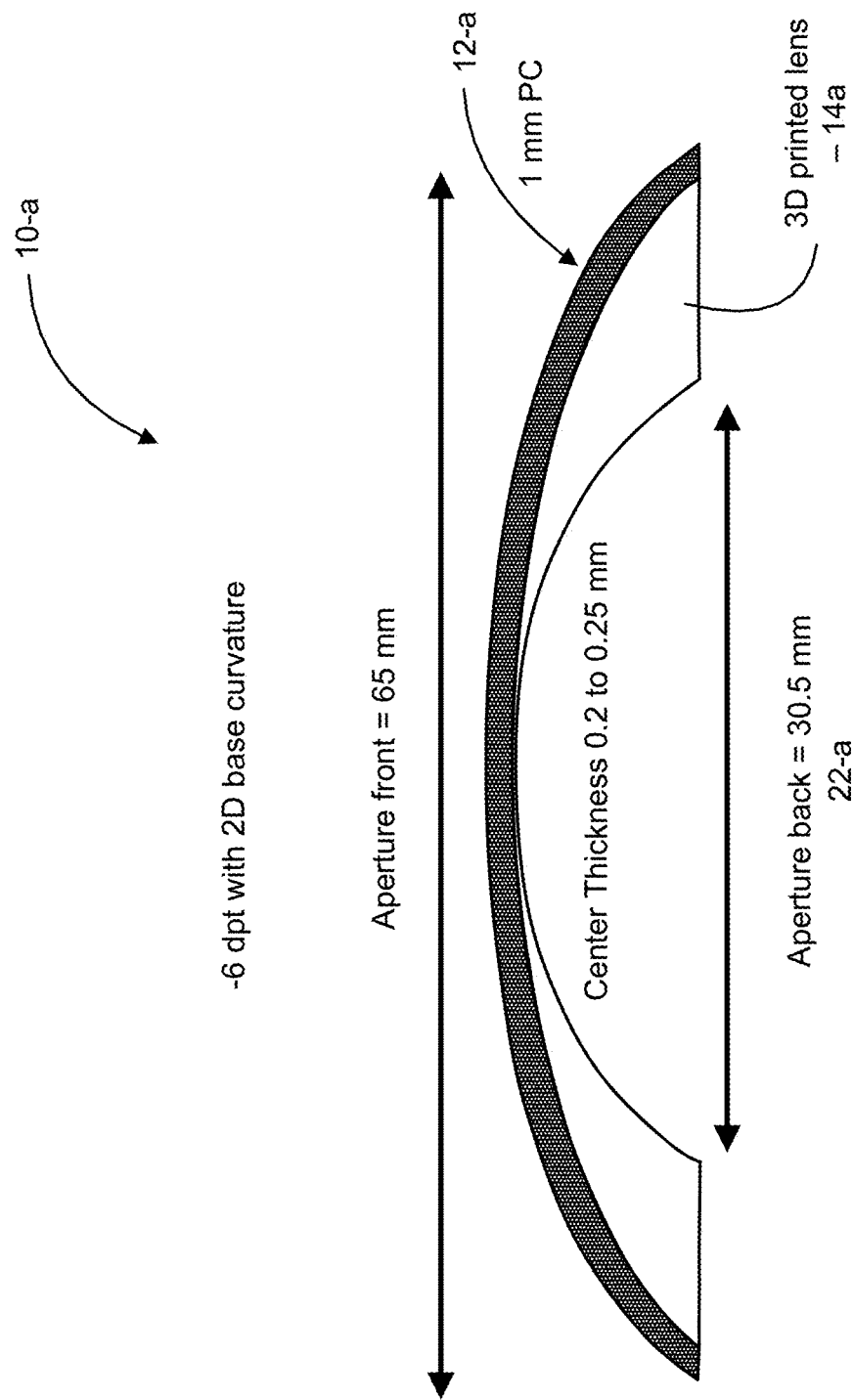
FIG. 3 illustrates an example of the ophthalmic lens of FIG. 1 that provides a high power vision correction (−6 diopter), has a reduced thickness perimeter edge, and employs a curved front lens assembly with 2D world-side surface base curvature.
Figure 4:
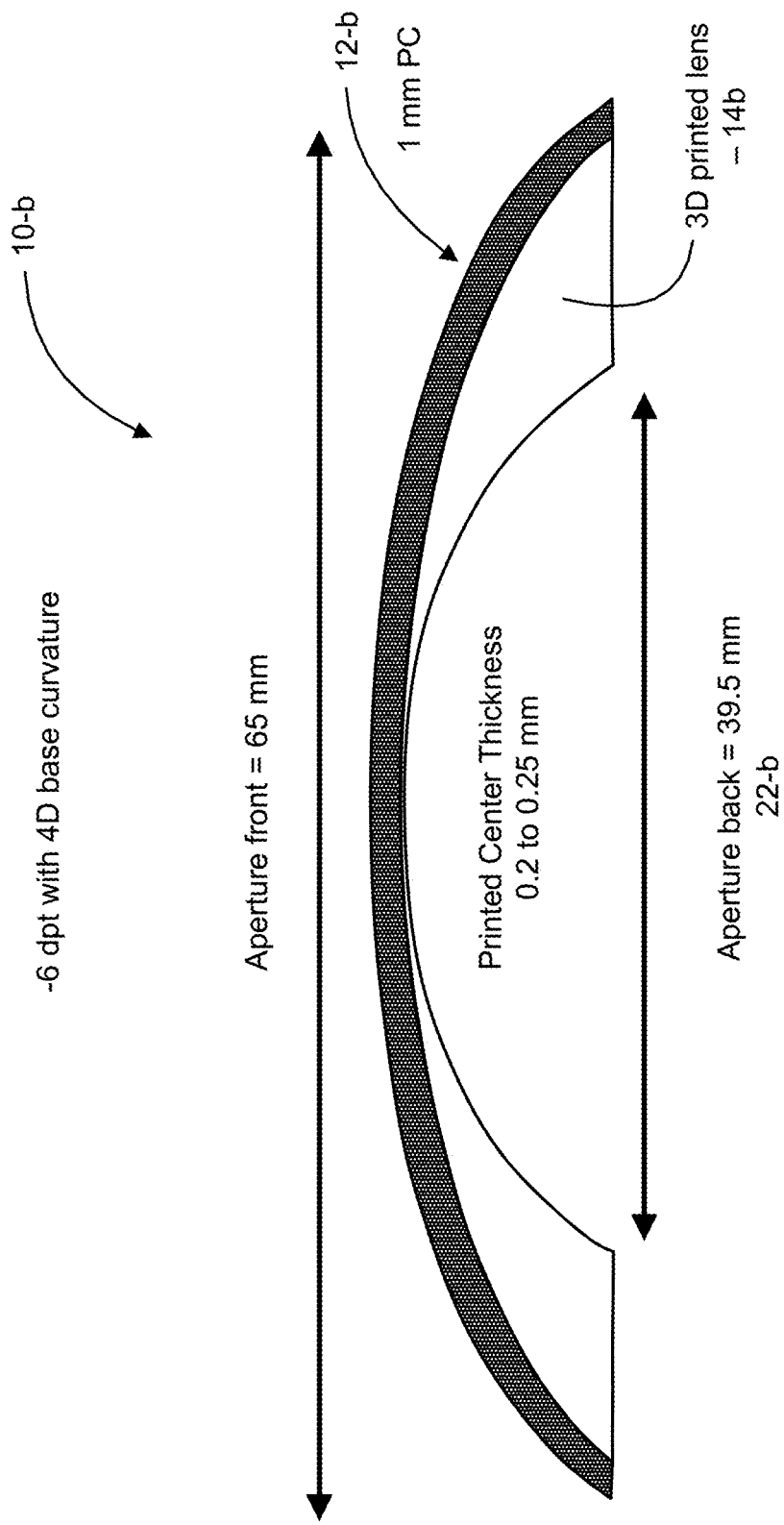
FIG. 4 illustrates an example of the ophthalmic lens of FIG. 1 that provides a high power vision correction (−6 diopter), has a reduced thickness perimeter edge, and employs a curved front lens assembly with 4D world-side surface base curvature.
Figure 5:
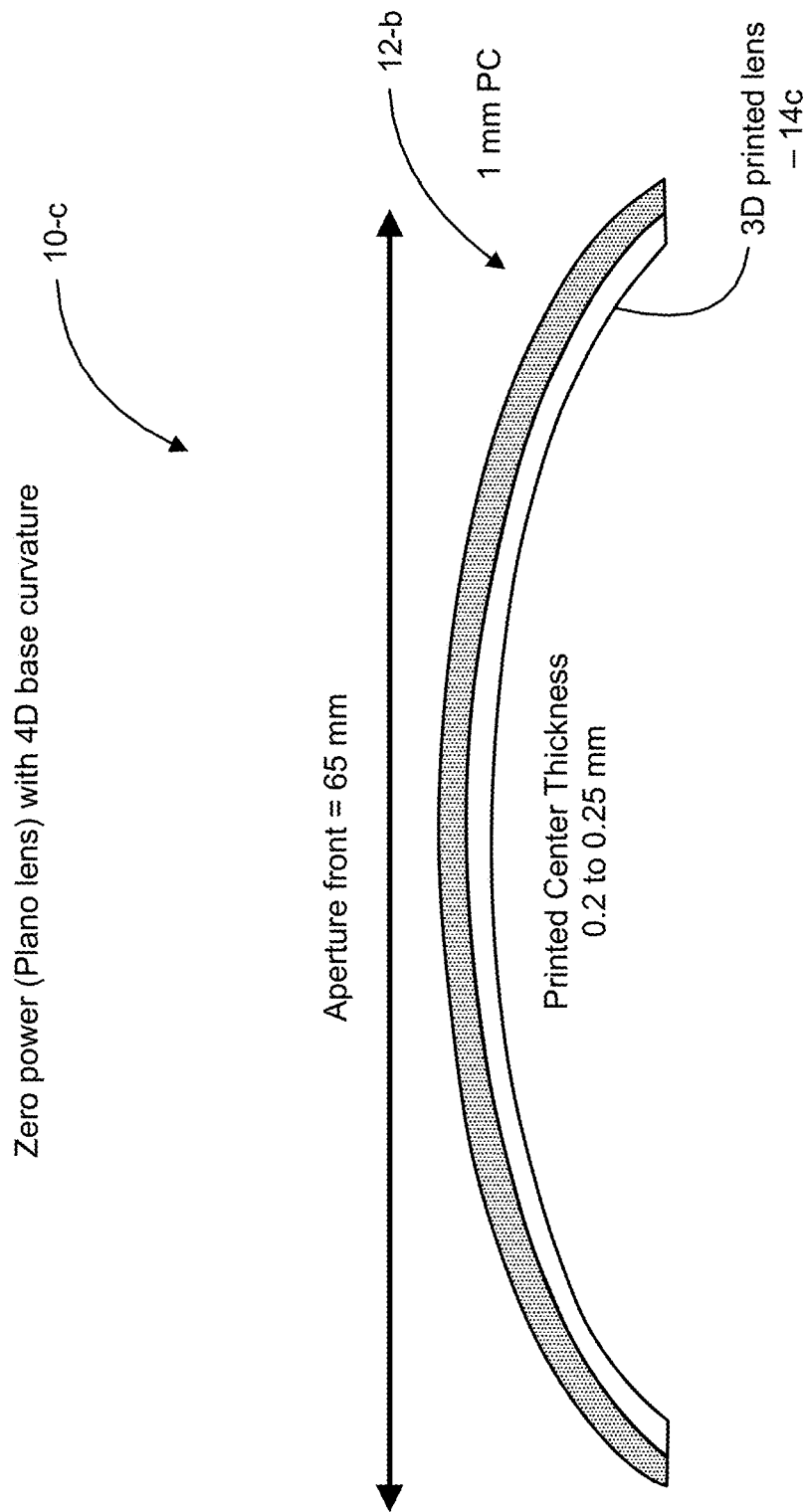
FIG. 5 illustrates an example of the ophthalmic lens of FIG. 1 that provides no vision correction (Plano lens) using a curved front lens assembly with 4D world-side surface base curvature.
Figure 6:
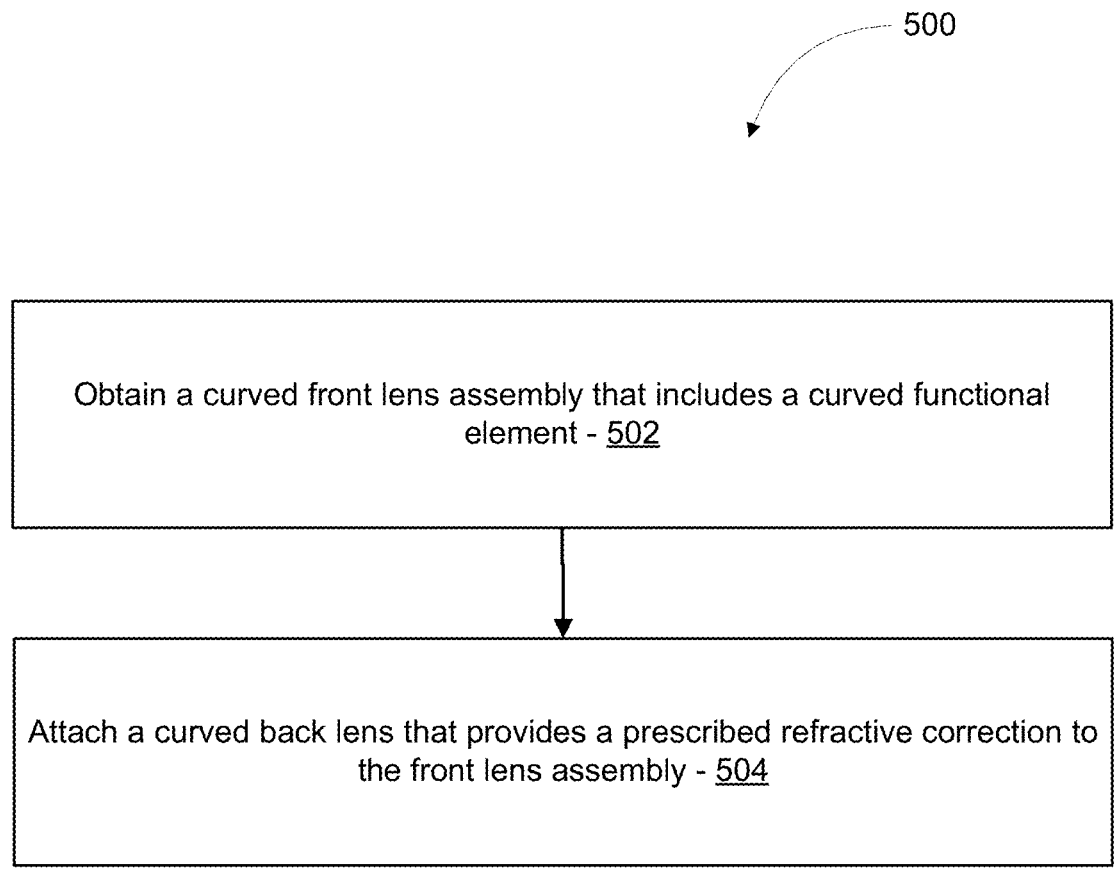
FIG. 6 illustrates a process for fabricating the ophthalmic lens of FIG. 1.

The external world-wide convex surface 22 can have a suitable predetermined world-side surface base curvature selected from any suitable predetermined available world-side surface base curvatures. For example, the external world-wide convex surface 22 can have a 2D world-side surface base curvature, which is a common world-side surface base curvature used in prescription glasses. As another example, the external world-wide convex surface 22 can have a 6D world-side surface base curvature, which is a common world-side surface base curvature used in sunglasses. FIG. 3 illustrates an example lens 10-a of the ophthalmic lens 10 that provides a −6 diopter vision correction using an example curved front lens assembly 12-a of the curved front lens assembly 12 with 2D world-side surface base curvature and a corresponding example curved back lens 14-a of the curved back lens 14. FIG. 4 illustrates an example lens 10-b of the ophthalmic lens 10 that provides a −6 diopter vision correction using an example curved front lens assembly 12-b of the curved front lens assembly 12 with 4D world-side surface base curvature and a corresponding example curved back lens 14-b of the curved back lens 14. FIG. 5 illustrates an example lens 10-c of the ophthalmic lens 10 that provides no vision correction (zero power—Plano lens) using the example curved front lens assembly 12-b of the curved front lens assembly 12 with 4D world-side surface base curvature and a corresponding example curved back lens 14-c of the curved back lens 14.

FIG. 5 illustrates a process 500 for fabricating the ophthalmic lens 10. In act 502, a curved front lens assembly (e.g., curved front lens assembly 12) that includes a functional element (e.g., curved functional element 18) is obtained. The functional element can be incorporated into the front lens assembly using any suitable approach. For example, the functional element can be integral to the curved front lens assembly. In another example, the functional element can be embedded within a curved front lens (e.g., curved front lens 16) of the curved front lens assembly. In yet another example, the functional element can be laminated onto the user side concave surface of the curved front lens. In many embodiments, the curved front lens assembly forms a world side convex surface of the ophthalmic lens 10. In many embodiments, the functional element is configured for at least one of modifying or blocking light from a real world scene viewed via the ophthalmic lens 10 or overlaying virtual image content on the real world scene viewed via the ophthalmic lens 10. Obtaining the curved front lens assembly can include molding the curved front lens from polycarbonate or casting the curved front lens from a urethane-based monomer. Obtaining the curved front lens assembly can include forming the curved front lens assembly to provide a Plano vision correction. Obtaining the curved front lens assembly can include forming the functional element to have a curved shape that matches the curved front lens. Obtaining the curved front lens assembly can include forming the functional element for overlaying virtual image content on a real world scene viewed via the ophthalmic lens 10.

In act 504, a curved back lens (e.g., curved back lens 14) is attached to the curved front lens assembly. The curved back lens is shaped to provide a vision correction and forms the user side surface of the ophthalmic lens 10. The curved back lens can be attached to the curved front lens assembly using any suitable approach. As one example, the curved back lens can be formed on the user side surface of the curved front lens assembly using a suitable three dimensional printing process. As another example, the curved back lens can be separately formed and then adhered to the curved front lens assembly using a suitable approach. For example, the curved back lens can be molded from a suitable material. In some embodiments, the molded material is cured using ultraviolet light. As another example, the curved back lens can be produced from a suitable lens blank using mechanical grinding and/or polishing. Attaching the curved back lens to the curved front lens assembly can include forming the curved back lens in a negative meniscus lens configuration so that the vision correction corrects myopia. Attaching the curved back lens to the curved front lens assembly can include forming the curved back lens in a positive meniscus lens configuration so that the vision correction corrects hyperopia.

The curved back lens can have a defined shape so that the ophthalmic lens 10 provides a prescribed vision correction for a wearer of glasses that include the ophthalmic lens 10. The curved back lens can have a shape defined using known approaches to provide any one of a wide variety of vision corrections including, but not limited to, lower order optical aberrations (myopia, hyperopia, astigmatism) and/or higher order optical aberrations (coma aberrations, trefoil aberrations, spherical aberrations).

Prior to attaching the curved back lens 14 to the curved front lens assembly 12, additional processing acts can be accomplished with regard to the curved front lens assembly 12. For example, the curved front lens assembly 12 can be coated with an optical de-coupling material with a low index of refraction. The curved front lens assembly 12 can be coated with an adhesion promoter to enhance adhesion of the curved back lens 14 to the curved front lens assembly 12.

After attaching the curved back lens 14 to the curved front lens assembly 12, additional processing acts can be accomplished. For example, the world-side convex surface of the ophthalmic lens 10 and/or the user side surface of the ophthalmic lens 10 can be coated with an anti-scratch hard coating. The world-side convex surface of the ophthalmic lens 10 and/or the user side surface of the ophthalmic lens 10 can be coated with one or more ant-reflection layers. The world-side convex surface of the ophthalmic lens 10 and/or the user side surface of the ophthalmic lens 10 can be coated with an anti-fog material. The world-side convex surface of the ophthalmic lens 10 and/or the user side surface of the ophthalmic lens 10 can be coated with one or more hydrophobic coatings. The world-side convex surface of the ophthalmic lens 10 and/or the user side surface of the ophthalmic lens 10 can be coated with one or more oleophobic coatings. The world-side convex surface of the ophthalmic lens 10 and/or the user side surface of the ophthalmic lens 10 can be coated with one or more photochromic coatings.

Some or all of the process 500 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 7:
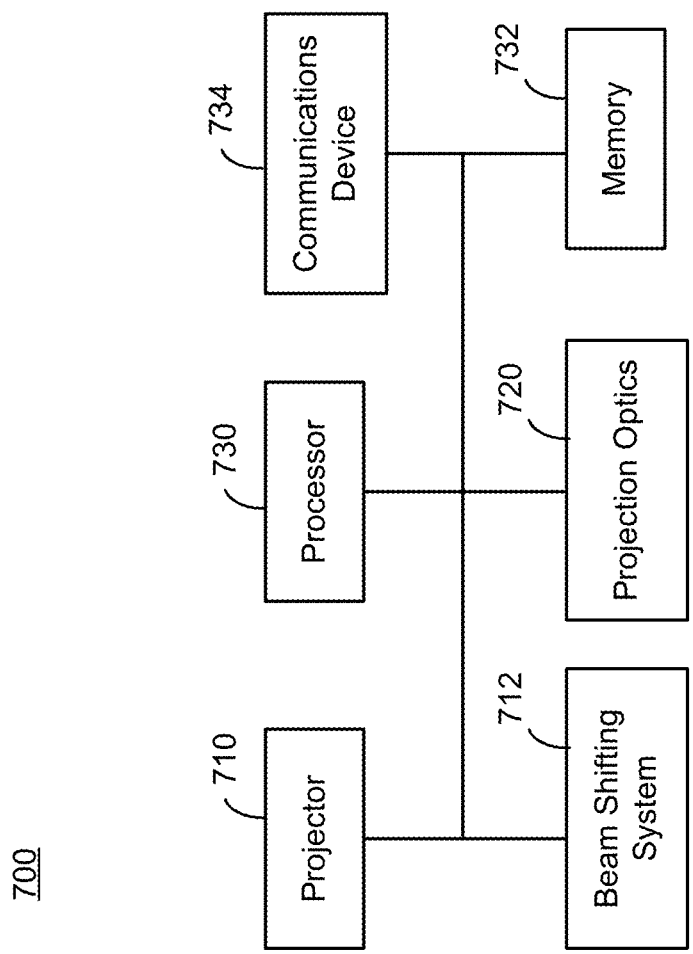
FIG. 7 illustrates an augmented reality system in which the ophthalmic lens of FIG. 1 can be employed.

FIG. 7 illustrates a schematic diagram of a laser beam scanning augmented reality system in accordance with an embodiment of the present disclosure. As illustrated in FIG. 7, laser beam scanning augmented reality system 700 includes a projector 710 and a beam shifting system 712. In some embodiments, beam shifting system 712 is integrated as an element of projector 710, whereas in other embodiments, for example, when integrated with an eye-tracking system, beam shifting system 712 can be implemented as a separate optical element. The laser beam scanning augmented reality system 700 can also include projection optics 720 operable to direct light produced using projector 710 and/or beam shifting system 712 toward a user. For example, the projection optics 720 can be embodied in a curved augmented reality combiner incorporated into the curved front lens assembly 12 to overlay virtual image content on a real world scene viewed by the user of the ophthalmic lens 10.

The laser beam scanning augmented reality system 700 additionally includes a processor 730 (e.g., a microprocessor), a memory 732, and a communications device 734. The memory 732, also referred to as storage media, stores computer-readable instructions of an application, where the computer-readable instructions are executable by processor 730 to run the application. Additional description related to these elements is provided more fully below.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

Figure 8:
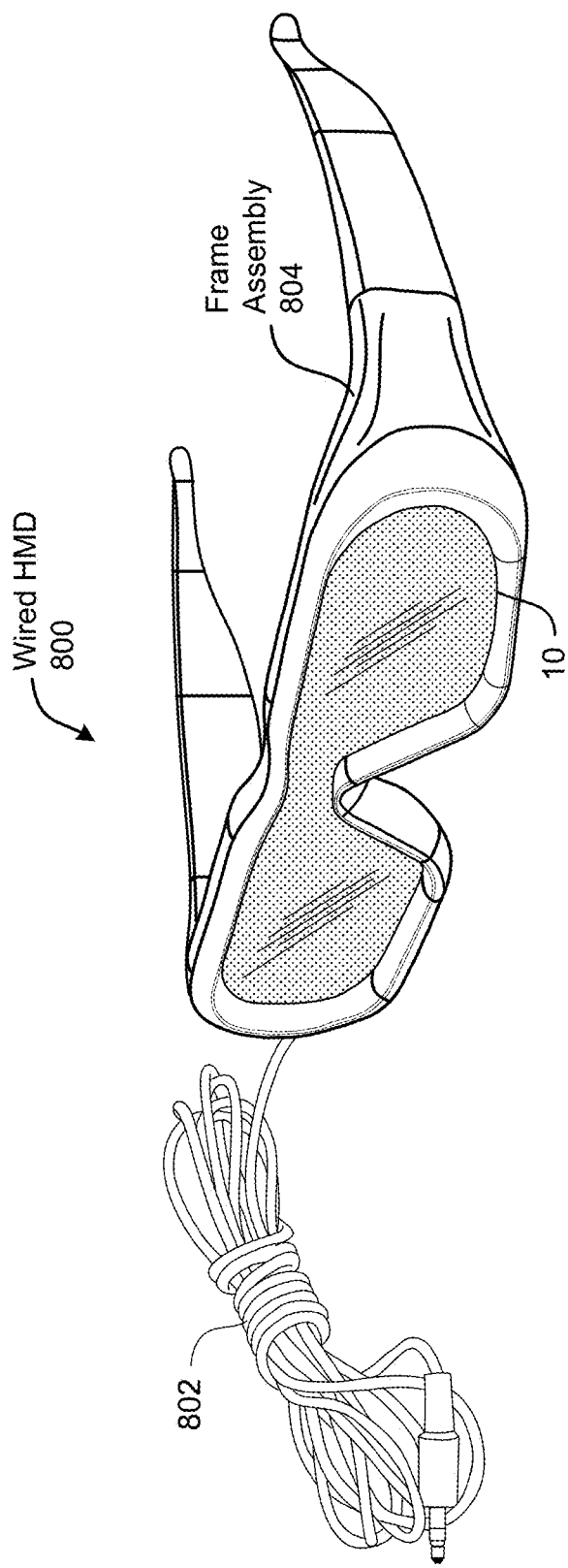
FIG. 8 illustrates a wired head-mounted display (HMD) system in which the ophthalmic lens of FIG. 1 can be employed.

FIG. 8 is a perspective view of a wired head-mounted display (HMD) system 800. The wired HMD system 800 includes an augmented reality embodiment of the ophthalmic lens 10, a wire 802 and a frame assembly 804. The frame assembly 804 holds or supports the lens 10. The frame assembly 804 may be goggles. Alternatively, other assemblies may be used for the HMD system 800. The wire 802 connects the wired HMD system 800 to an electronic device (not illustrated in FIG. 1). For example, the wire 802 may include a standard or proprietary plug that plugs into a socket of the electronic device. The electronic device can include circuitry or software to detect when the wired HMD system 800 is plugged in for one or more various modes of operation of the electronic device. The wired HMD system 800 may include electronics to display the images on the curved functional element 18 and/or control tint of the curved functional element 18. The frame assembly 804 may house the display electronics as well as the communication circuitry for wired communication over the wire 802.

Figure 9:
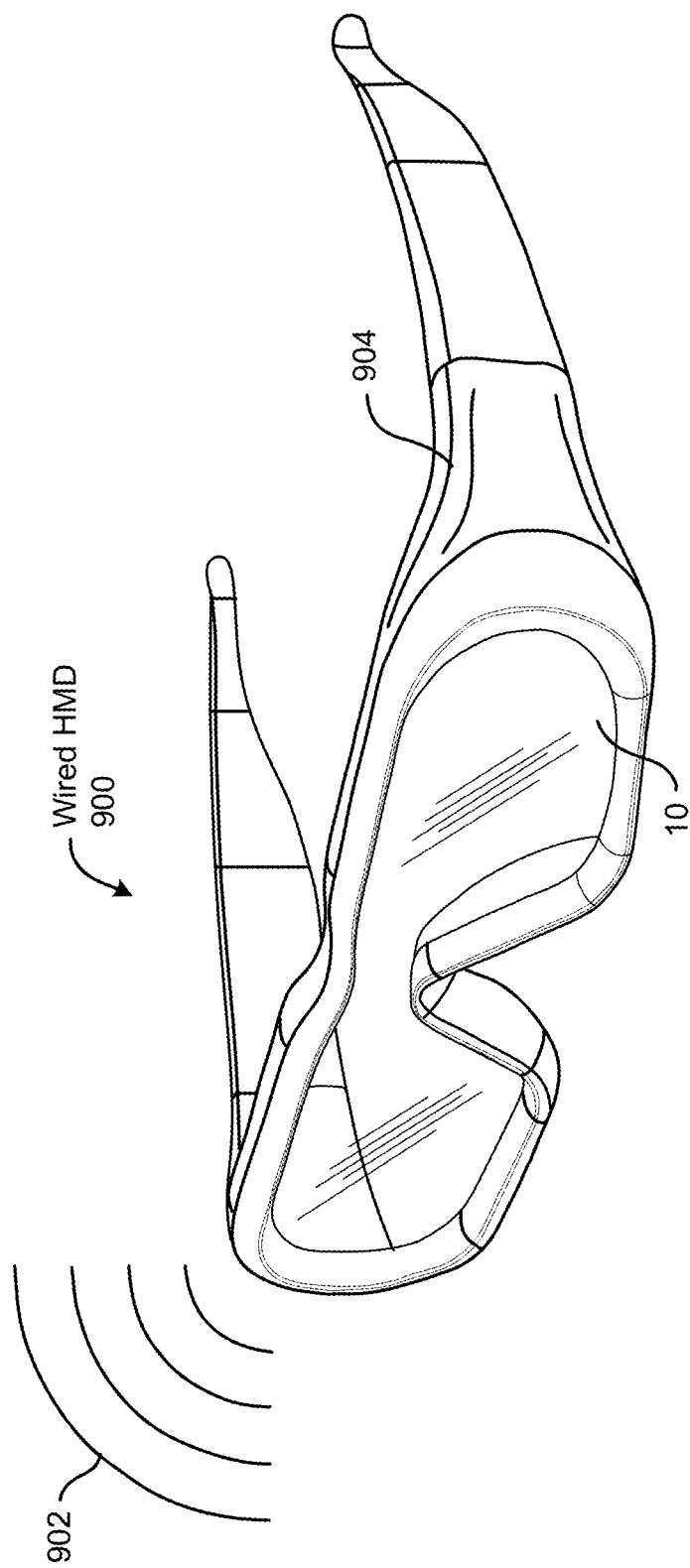
FIG. 9 illustrates a wireless HMD system in which the ophthalmic lens of FIG. 1 can be employed.

FIG. 9 is a perspective view of a wireless HMD system 900 that employs an augmented reality embodiment of the ophthalmic lens 10. The wireless HMD system 900 includes the ophthalmic lens 10, a frame assembly 904 and a wireless circuitry 902 (not illustrated in FIG. 9) to wirelessly communicate with an electronic device (not illustrated in FIG. 9). Various wireless technologies may be used by the wireless HMD system 900 to communicate with the electronic device. The electronic device can also include circuitry or software to detect when the wireless HMD system 900 is within range and activated for one or more various modes of operation of the electronic device. The wireless HMD system 900 may include electronics to display the images on the curved functional element 18 and/or control the tint of the curved functional element 18. For ease of description, the wired HMD system 800 and wireless HMD system 900 are hereinafter referred to as HMD system 900.

The lens 10 is illustrated in FIG. 8 and FIG. 9 as a single lens, but in other embodiments, the HMD system 900 can include multiple lenses, such as one lens 10 for each eye. The shape and size of the glasses that hold the one or more lenses can also vary. The following description uses a single lens for purposes of description except for specifically noted.

Figure 10:
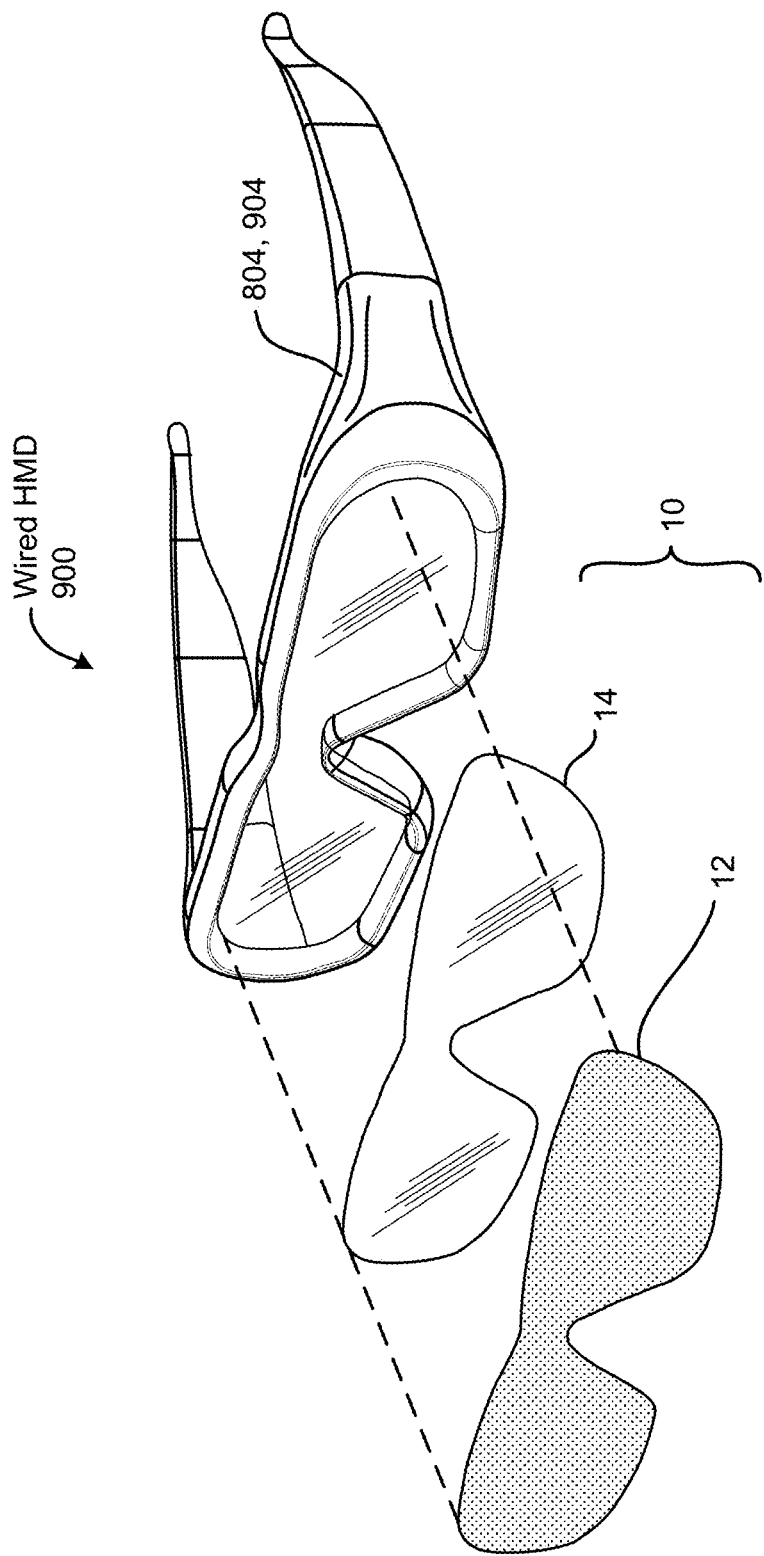
FIG. 10 illustrates a wireless HMD system in which the ophthalmic lens of FIG. 1 can be employed.

FIG. 10 is a perspective view of a HMD system 900 showing an exploded view of the lens 10 that separately shows the curved front lens assembly 12 and the curved back lens 14. The curved functional element 18 can include one or more display units. The display units may be miniaturized. In one embodiment, the one or more display units are LCD units. In another embodiment, LCos display units may be used. Alternatively, other display technologies can be used in the functional element 18. In many embodiments, the functional element 18 includes a transparent material. Alternatively, the functional element can include a semitransparent material. The functional element 18 can display images. These images may be 2D images, three dimensional images, or any combination thereof. For example, the functional element 18 can be used with three dimensional technologies to shutter one lens while displaying an image on the other lens, and then to display another image on the one lens while shuttering the other lens. The functional element 18 can display a computer-generated image (CGI) (also referred to as a virtual image), frames of a video, or a combination of both. For example, the HMD system 900 can allow a CGI to be superimposed on a real-world view (augmented reality or mixed reality). Combining real-world view with CGI can be done by projecting the CGI through a partially reflective mirror and viewing the real world directly (called Optical See-Through). Combining real-world view with CGI can also be done electronically by accepting video from a camera and mixing it electronically with CGI (called Video See-Through). The camera may be a peripheral of the HMD system 900.

In one embodiment, the functional element 18 uses an optical mixer with a capability of reflecting artificial images as well as letting real images to cross the lens and let the user to look through it. The functional element 18 can incorporate various optic technologies, such as curved mirror or waveguide technologies, as well as diffraction optics, holographic optics, polarized optics, reflective optics, switchable waveguide, or the like. Regardless of the optic technologies and optic techniques, the functional element 18 can used to display images from the electronic device.

The functional element 18 can also include a variable-transparency layer. The variable-transparency layer may be variable-transparency glass, also referred to as Smart glass, Magic glass, or switchable glass. The variable-transparency layer can be electrically switchable glass (or plastic) or glazing that changes light transmission properties when a voltage is applied. Certain types of variable-transparency layers allow the electronic device to control the amount of light transmission. In many embodiments, when a voltage is applied to the variable-transparency layer, the variable-transparency layer changes from transparent to translucent, partially blocking light while maintaining a clear view through the glass or the variable-transparency layer changes from transparent to opaque, substantially or wholly blocking light through the glass. The variable-transparency layer can use various technologies, including electrochromic devices, suspended particle devices, and liquid crystal devices.

For example, electrochromic devices change light transmission properties in response to voltage and thus allow control over the amount of light passing through the lens 10. The electrochromic layer can change between a transparent state and an opaque state. In another embodiment, the electrochromic layer can change between a transparent state and a mirror-like state (on an outer surface of the functional element 18).

In suspended particular devices (SPDs), a thin film laminate of rod-like particles suspended in a fluid is placed between two glass or plastic layers, or attached to one layer. When no voltage is applied, the suspended particular are arranged in random orientations and tend to absorb light, so that the glass panel looks dark (or opaque), blue, grey, or black. When voltage is applied, the suspended particles align and let light pass.

In polymer dispersed liquid crystal devices (PDLCs), there is a liquid mix of polymer and liquid crystals placed between two layers of glass or plastic that each includes a thin layer of a transparent, conductive material to form a capacitor structure. Electrodes are attached to the transparent electrodes. With no applied voltage, the liquid crystals are randomly arranged in the droplets, resulting in scattering of light as it passes through the glasses. This may result in a milky white appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. PDLCs, however, are not typically used for switchable tint sunglasses as the states are clear and scattering.

Suitable technologies for switchable tint sunglasses include dichroic dye and twisted nematic liquid crystal between cross polarizers.

In one embodiment, the functional element 18 includes two lenses for an active shutter three dimensional system (also referred to as alternate frame sequencing, alternate image, AI, alternating field, field sequential or eclipse method). Active shutter three dimensional system is a technique of displaying stereoscopic three dimensional images by presenting the image intended for the left eye while blocking the right eye's view, then presenting the right-eye image while blocking the left eye, at a speed high enough to not be perceived by human sight, thus allowing the images to be perceived as fused into a single three dimensional image. Active shutter three dimensional systems generally use liquid crystal shutter glasses (also called LCS glasses, LCS three dimensional glasses, LC shutter glasses or active shutter glasses). Each eye's glass contains a liquid crystal layer which has the property of becoming opaque when voltage is applied, being otherwise transparent. The glasses are controlled by a timing signal that allows the glasses to alternately block one eye, and then the other, in synchronization with the refresh rate of the screen. The timing synchronization to the video equipment may be achieved via a wired signal, or wirelessly by either an infrared or radio frequency (e.g. Bluetooth, DLP link) transmitter. However, instead of controlling the active shutter three dimensional system to alternate darkening the lens for alternating eyes, the electronic device can control the two lenses together, transitioning the lenses between the opaque state and transparent state concurrently or simultaneously. In another embodiment, the functional element 18 includes a liquid crystal layer, typically used in active shutter three dimensional systems. It should be noted that in some embodiments, the functional element 18 can include the active shutter three dimensional system (or the liquid crystal layer us to shutter the lens) and the functional element 18 can include the active shutter three dimensional system to enable displaying three dimensional images (shuttering the lenses in the display layer), while the functional element 18 is activated in the transparent state or the opaque state (also referred to herein as the immersion state).

In one embodiment, the functional element 18 includes variable-transparency glass. In other embodiment, the functional element 18 can include a coating or a glazing of variable-transparency material that changes light transmission properties in response to signals from the electronic device. It should be noted that the functional element 18 can include one or more sheets of material. For example, the functional element 18 can be produced by means of lamination of two or more glass or polycarbonate sheets.

The HMD system 900 may display different images for the left eye and the right eye for depth perception. There are multiple ways to provide these separate images: including 1) using dual video inputs, thereby providing a completely separate video signal to each eye; 2) time-based multiplexing in which techniques such as frame sequential combine two separate video signals into one signal by alternating the left and right images in successive frames; 3) side-by-side or top-bottom multiplexing in which half of the image is allocated to the left eye and the other half of the image to the right eye. It should also be noted that HMD systems can provide depth perception and can be binocular devices where both eyes are presented with the same image.

The HMD system 900 may include one or more peripherals associated with the lens 10 (or lenses). For example, the HMD system 900 can incorporate a positioning system that tracks the wearer's head position and angle, so that the picture or symbol displayed is congruent with the outside world using see-through imagery. The HMD system 900 may also include head tracking for slaving the imagery. Head-mounted displays may also be used with tracking sensors that allow changes of angle and orientation to be recorded. When such data is available in the system computer, it can be used to generate the appropriate CGI for the angle-of-look at the particular time. This allows the user to "look around" a virtual reality environment simply by moving the head without the need for a separate controller to change the angle of the imagery. In radio-based systems (compared to wires), the wearer may move about within the tracking limits of the system. The HMD system 900 may also include eye tracking. Eye trackers measure the point of gaze, allowing a computer to sense where the user is looking. This information is useful in a variety of contexts such as user interface navigation by sensing the user's gaze, a computer can change the information displayed on a screen, bring additional details to attention, etc. The HMD system 900 may also include hand tracking that tracks hand movement from the perspective of the HMD system allows natural interaction with content and a convenient game-play mechanism. The HMD system can also include one or more input devices, such as touchpads, touch buttons, buttons, or other input devices. The HMD system 900 can also include speech recognition, gesture recognition, or the like. The HMD system 900 can also include a camera for capturing images (e.g., still photos or video).

Figure 11:
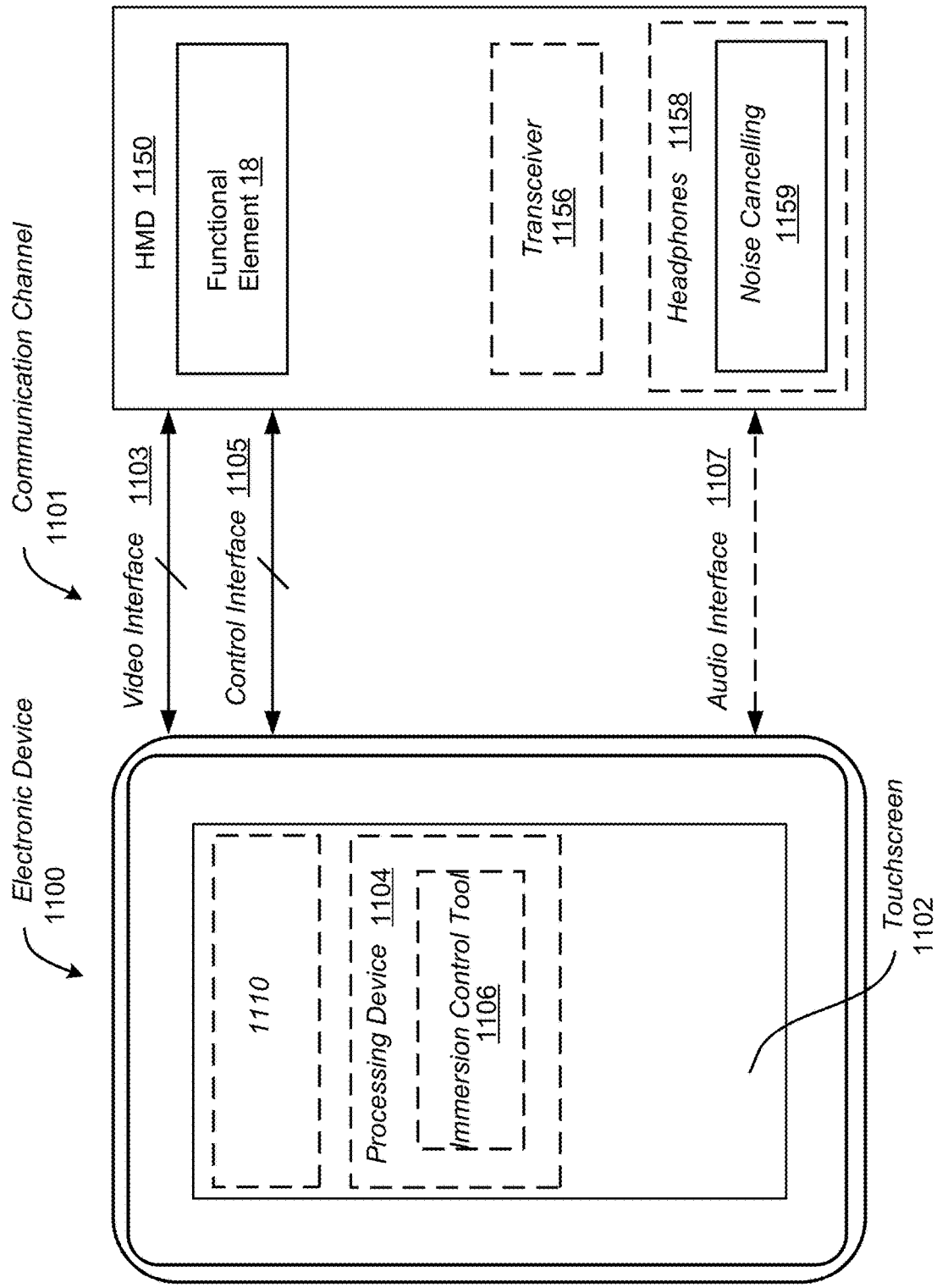
FIG. 11 is a block diagram of an electronic device with an immersion control tool for an augmented reality system in which the ophthalmic lens of FIG. 1 can be employed.

FIG. 11 is a block diagram of an electronic device 1100 with an immersion control tool 1106 for controlling an HMD system 1150 with the functional element 18. In the depicted embodiment, the electronic device 1100 is a tablet device with a touchscreen 1102. In other embodiments, other types of electronic devices that consume media items may include the immersion control tool 1106. Among these electronic devices are electronic book readers, cellular telephones, PDAs, portable media players, netbooks, laptops and the like.

The electronic device 1100 also includes a processing device 1104. The processing device 1104 may be a processor, a microprocessor, a microcontroller, a special-purpose processor, a digital signal processor ("DSP"), an application specific integrated circuit ("ASIC"), a field programmable gate array ("FPGA"), or the like. In one embodiment, the processing device 1104 executes the immersion control tool 1106 to display vertical content via the functional element 18. Although illustrated as being executed by the processing device 1104, the immersion control tool 1106 can be implemented as processing logic comprising hardware (circuitry, dedicated logic, etc.), software (such as is run on a general purpose computing system or a dedicated machine), firmware (embedded software), or any combination thereof.

As described herein, the electronic device 1100 can output video (or any type of images) on a video interface 1103 via a communication channel 1101 with the HMD 1150. The HMD system 1150 includes the functional element 18 to display the video (or images) and/or toggled between a transparent state and an opaque state by the immersion control tool 1106.

In one embodiment, the communication channel 1101 is a wireless communication channel. The electronic device 1100 includes a transceiver 1110 and the HMD system 1150 includes a transceiver 1156 to establish the wireless communication channel between the devices. A transceiver 1110 (and 1156) is a device including both a transmitter and a receiver. The transceivers may be radio frequency (RF)

transceivers. Alternatively, other types of transceivers and communication channels can be for communication between the two devices. In another embodiment, the electronic device 1100 includes a transmitter and the HMD system 1150 includes a receiver for the communication channel 401. In another embodiment, the communication channel 1101 is a wired communication channel, such as a wired communication channel between HMD system 700 and the electronic device 1100. It should be noted that communication channel 1101 is illustrated as including the video interface 1103, control interface 1105, and audio interface 1107. A single interface can be used to send the image data and the control data (or signals). In other embodiments, various communication channels may be used for the multiple interfaces. Various configurations of transmitting and receiving the images and the control data (or signals) between the devices can be used.

As described herein, one of the problems people have with tablet devices is the lack of the ability to immerse in a tablet experience (e.g. watching a movie on an airplane). Conventional head mounted goggle systems, which are opaque, do not readily allow a user to reengage with the outside world. The immersion control tool 1106 can be used with the HMD system 1150, which may be a head-mounted goggles accessory for the tablet device. The accessory contains glasses capable of display images, as well as potentially headphones for audio. The functional element 18 can have the two layers with one of the layers for displaying virtual image content and the other of the layers being reconfigurable between a transparent state and an opaque state based on a variable control by the immersion control tool 1106. The immersion control tool 1106 can control whether the user views the outside world through the lens 10 by controlling the transparency of the functional element 18.

Figure 12:
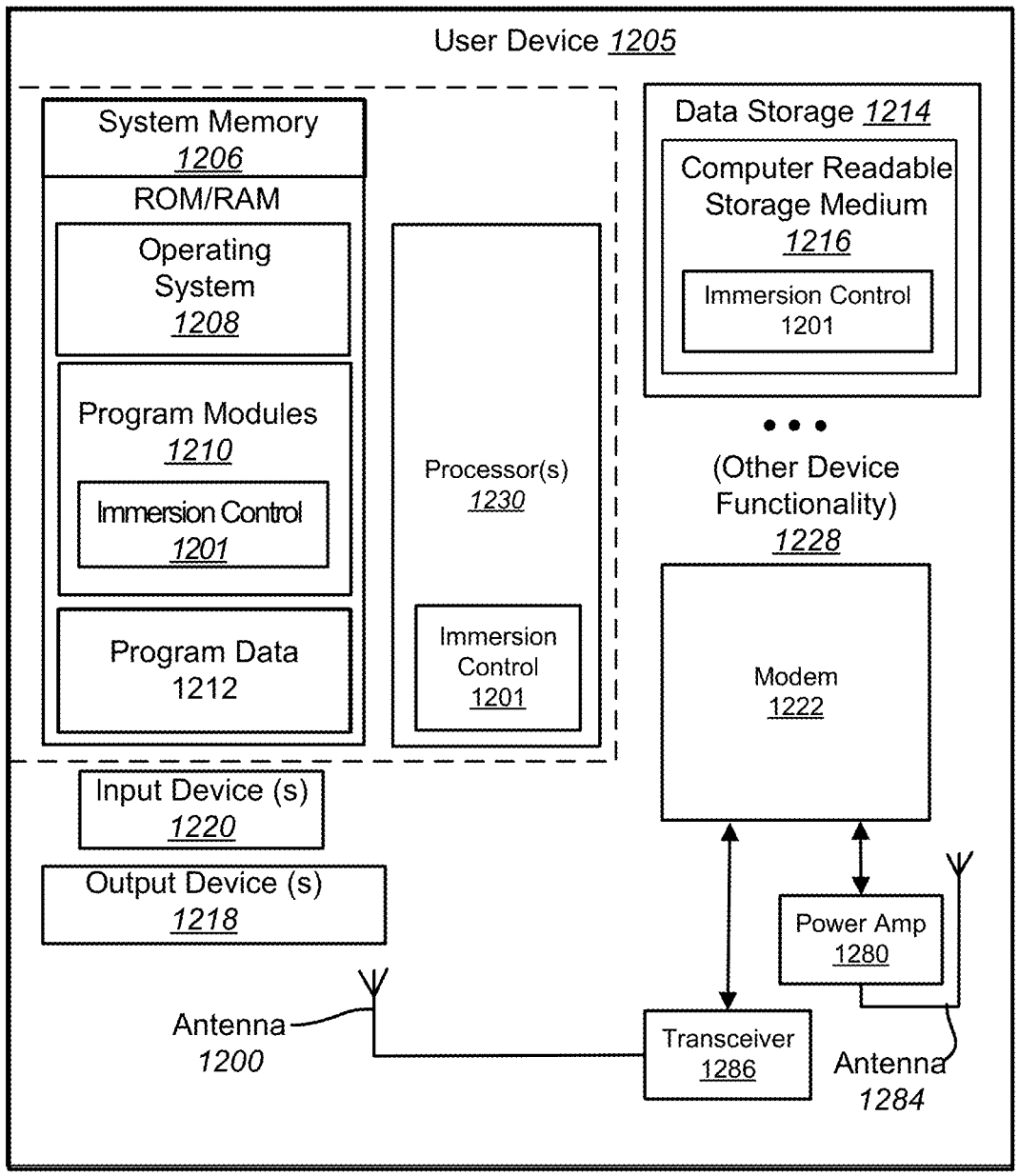
FIG. 12 is a block diagram of a user device having immersion control for an augmented reality system in which the ophthalmic lens of FIG. 1 can be employed.

FIG. 12 is a block diagram of a user device 1205 having immersion control 1201 according to one embodiment. The user device 1205 includes one or more processors 1230, such as one or more CPUs, microcontrollers, field programmable gate arrays, or other types of processing devices. The user device 1205 also includes system memory 1206, which may correspond to any combination of volatile and/or non-volatile storage mechanisms. The system memory 1206 stores information, which provides an operating system component 1208, various program modules 1210, including the immersion control 1201, program data 1212, and/or other components. The user device 1205 performs functions by using the processor(s) 1230 to execute instructions provided by the system memory 1206. The processor(s) 1230 can execute the immersion control 1201.

The user device 1205 also includes a data storage device 1214 that may be composed of one or more types of removable storage and/or one or more types of non-removable storage. The data storage device 1214 includes a computer-readable storage medium 1216 on which is stored one or more sets of instructions embodying any one or more of the functions of the user device 1205, as described herein. In one embodiment, the computer-readable storage medium 1216 includes the immersion control 1201. As shown, instructions may reside, completely or at least partially, within the computer readable storage medium 1216, system memory 1206 and/or within the processor(s) 1230 during execution thereof by the user device 1205, the system memory 1206 and the processor(s) 1230 also constituting computer-readable media. The user device 1205 may also include one or more input devices 1220 (keyboard, mouse device, specialized selection keys, etc.) and one or more output devices 1218 (displays, printers, audio output mechanisms, etc.).

The user device 1205 further includes a wireless modem 1222 to allow the user device 1205 to communicate via a wireless network (e.g., such as provided by a wireless communication system) with other computing devices, such as remote computers, an item providing system, and so forth. The wireless modem 1222 allows the user device 1205 to handle both voice and non-voice communications (such as communications for text messages, multimedia messages, media downloads, web browsing, etc.) with a wireless communication system. The wireless modem 1222 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1×RTT), evaluation data optimized (EVDO), high-speed downlink packet access (HSDPA), WLAN (e.g., Wi-Fi® network), etc. In other embodiments, the wireless modem 1222 may communicate according to different communication types (e.g., WCDMA, GSM, LTE, CDMA, WiMax, etc.) in different cellular networks. The cellular network architecture may include multiple cells, where each cell includes a base station configured to communicate with user devices within the cell. These cells may communicate with the user devices 1205 using the same frequency, different frequencies, same communication type (e.g., WCDMA, GSM, LTE, CDMA, WiMax, etc.), or different communication types. Each of the base stations may be connected to a private, a public network, or both, such as the Internet, a local area network (LAN), a public switched telephone network (PSTN), or the like, to allow the user devices 1205 to communicate with other devices, such as other user devices, server computing systems, telephone devices, or the like. In addition to wirelessly connecting to a wireless communication system, the user device 1205 may also wirelessly connect with other user devices. For example, user device 1205 may form a wireless ad hoc (peer-to-peer) network with another user device.

The wireless modem 1222 may generate signals and send these signals to power amplifier (amp) 1280 or transceiver 1286 for amplification, after which they are wirelessly transmitted via the antenna 1200 or antenna 1284, respectively. Although FIG. 12 illustrates power amp 1280 and transceiver 1286, in other embodiments, a transceiver may be used for all the antennas 1200 and 1284 to transmit and receive. Or, power amps can be used for both antennas 1200 and 1284. The antenna 1284, which is an optional antenna that is separate from the antenna 1200, may be any directional, omnidirectional or non-directional antenna in a different frequency band than the frequency bands of the antenna 1200. The antenna 1284 may also transmit information using different wireless communication protocols than the antenna 1200. In addition to sending data, the antenna 1200 and the antenna 1284 also receive data, which is sent to wireless modem 1222 and transferred to processor(s) 1230. It should be noted that, in other embodiments, the user device 1205 may include more or less components as illustrated in the block diagram of FIG. 12.

In one embodiment, the user device 1205 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of the antenna 1200 that operates at a first frequency band and the second wireless connection is associated with a second resonant mode of the antenna 1200 that operates at a second frequency band. In another embodiment, the first wireless connection is associated with the antenna 1200 and the second wireless connection is associated with the antenna 1284. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 1222 is shown to control transmission to both antennas 1200 and 1284, the user device 1205 may alternatively include multiple wireless modems, each of which is configured to transmit/receive data via a different antenna and/or wireless transmission protocol. In addition, the user device 1205, while illustrated with two antennas 1200 and 1284, may include more or fewer antennas in various embodiments.

The user device 1205 delivers and/or receives items, upgrades, and/or other information via the network. For example, the user device 1205 may download or receive items from an item providing system. The item providing system receives various requests, instructions and other data from the user device 1205 via the network. The item providing system may include one or more machines (e.g., one or more server computer systems, routers, gateways, etc.) that have processing and storage capabilities to provide the above functionality. Communication between the item providing system and the user device 1205 may be enabled via any communication infrastructure. One example of such an infrastructure includes a combination of a wide area network (WAN) and wireless infrastructure, which allows a user to use the user device 1205 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1205.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1205 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1205 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

Weight Savings for Example Cylindrical Lenses

Figure 13:
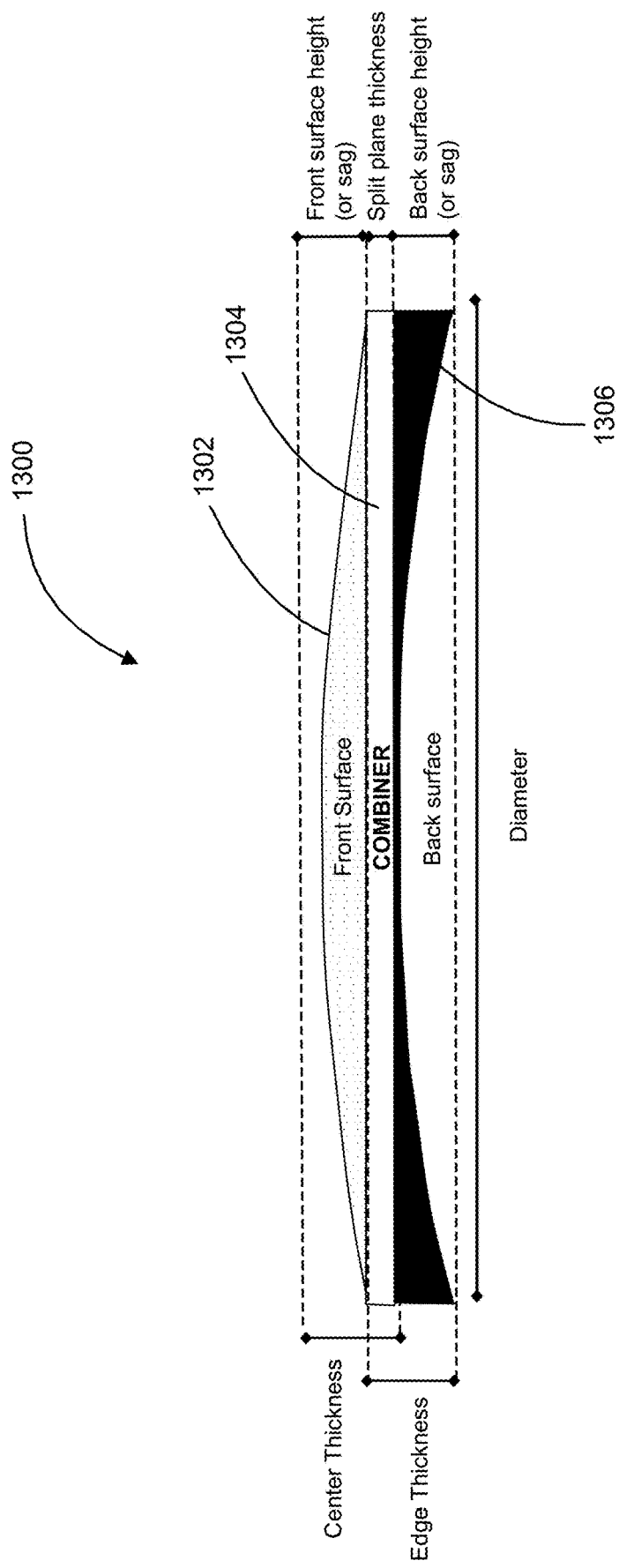
FIG. 13 illustrates an example known augmented reality ophthalmic lens configuration that includes a flat combiner and a front lens shaped to provide part of a prescribed vision correction.
Figure 14:
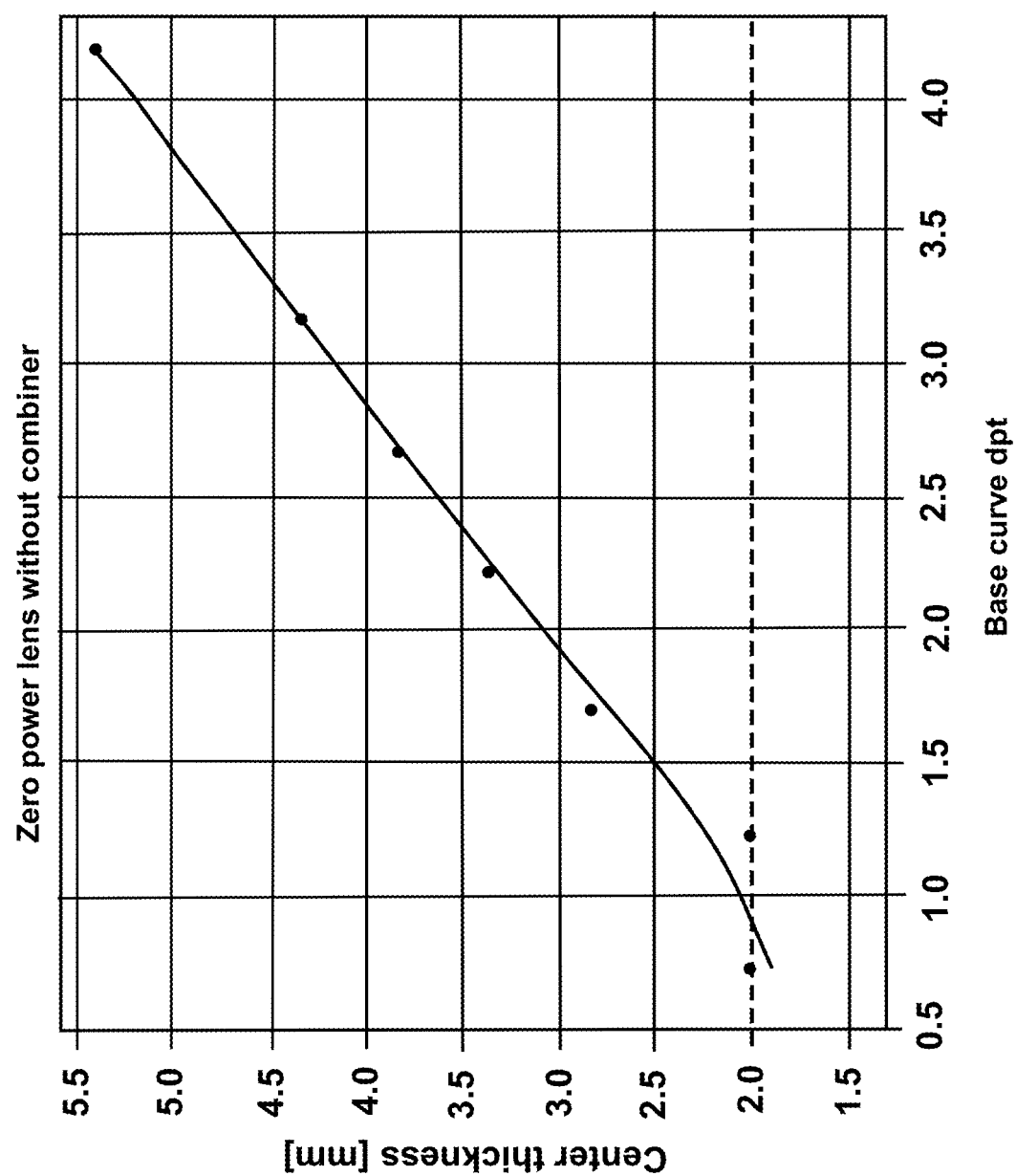
FIG. 14 illustrates total center thicknesses of example embodiments of the known augmented reality ophthalmic lens of FIG. 13.

Weight savings estimations for example cylindrical configurations of the ophthalmic lens 10 were determined by comparing calculated weights for example embodiments of the ophthalmic lens 10 with comparable examples of existing ophthalmic lens configurations. FIG. 13 illustrates an example known configuration augmented reality ophthalmic lens 1300. The ophthalmic lens 1300 includes a front surface half lens 1302, a flat augmented reality combiner 1304, and a back surface half lens 1306. The known configuration augmented reality ophthalmic lens 1300 is representative of split plane lens designs for flat functional elements or augmented reality combiners. Split plane lens designs for flat functional element or augmented reality combiners have a high center thickness for minus diopter vision corrections. The center thickness of a split plane lens design for flat functional element or augmented reality combiner is dependent on the world-side surface base curvature as illustrated in FIG. 13. FIG. 13 illustrates total center thicknesses of example embodiments of a zero power embodiment of the known configuration augmented reality ophthalmic lens 1300 (without accounting for the thickness of a functional element or augmented reality combiner) for a range of world-side surface base curvatures. In contrast, for a negative diopter vision correction, the ophthalmic lens 10 has a center thickness that is independent of world-side surface base curvature.

Figure 15:
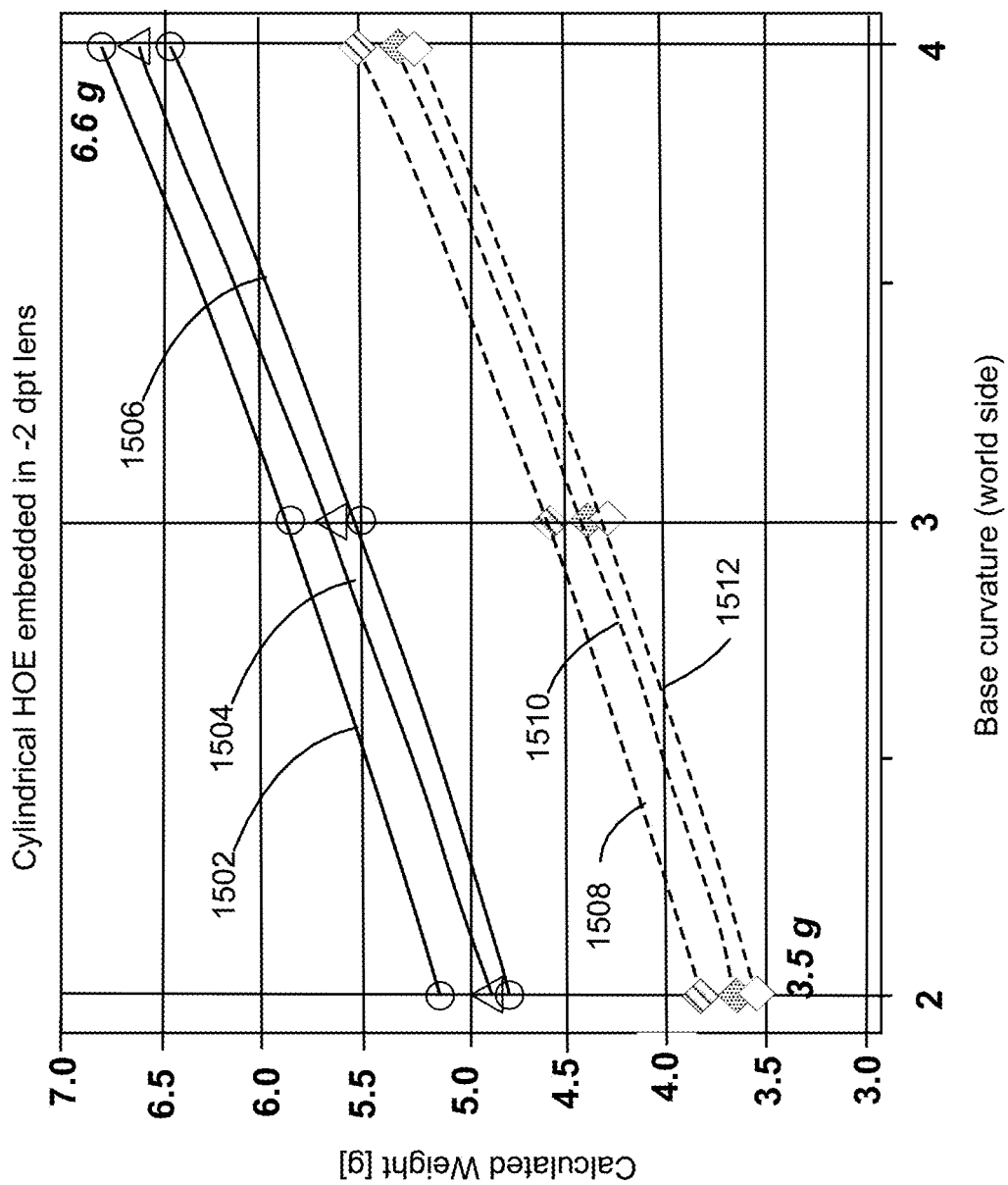
FIG. 15 illustrates weights of example cylindrical configurations of the ophthalmic lens of FIG. 1 and weights of comparable example cylindrical configurations of existing ophthalmic lenses.
Figure 16:
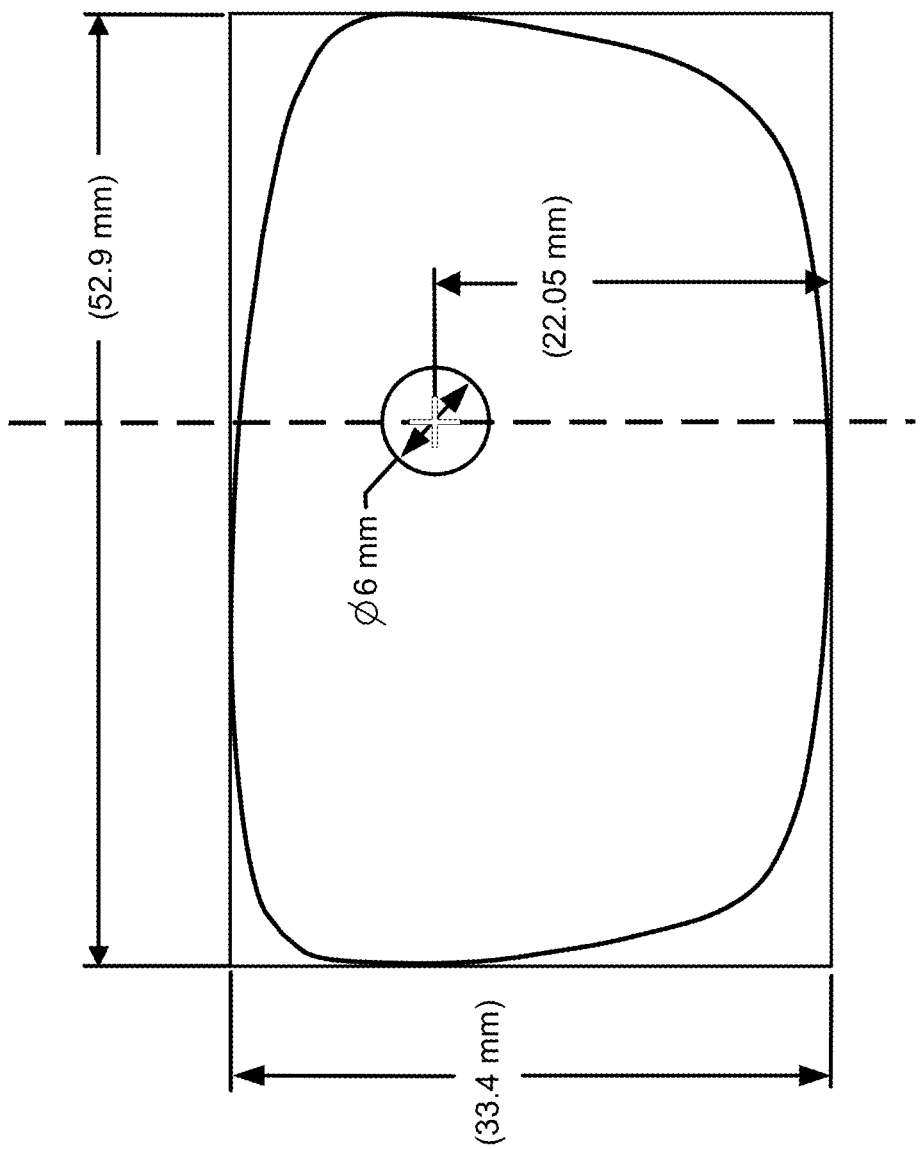
FIG. 16 illustrates a lens profile used to determine the weights of FIG. 15.
Figure 17:
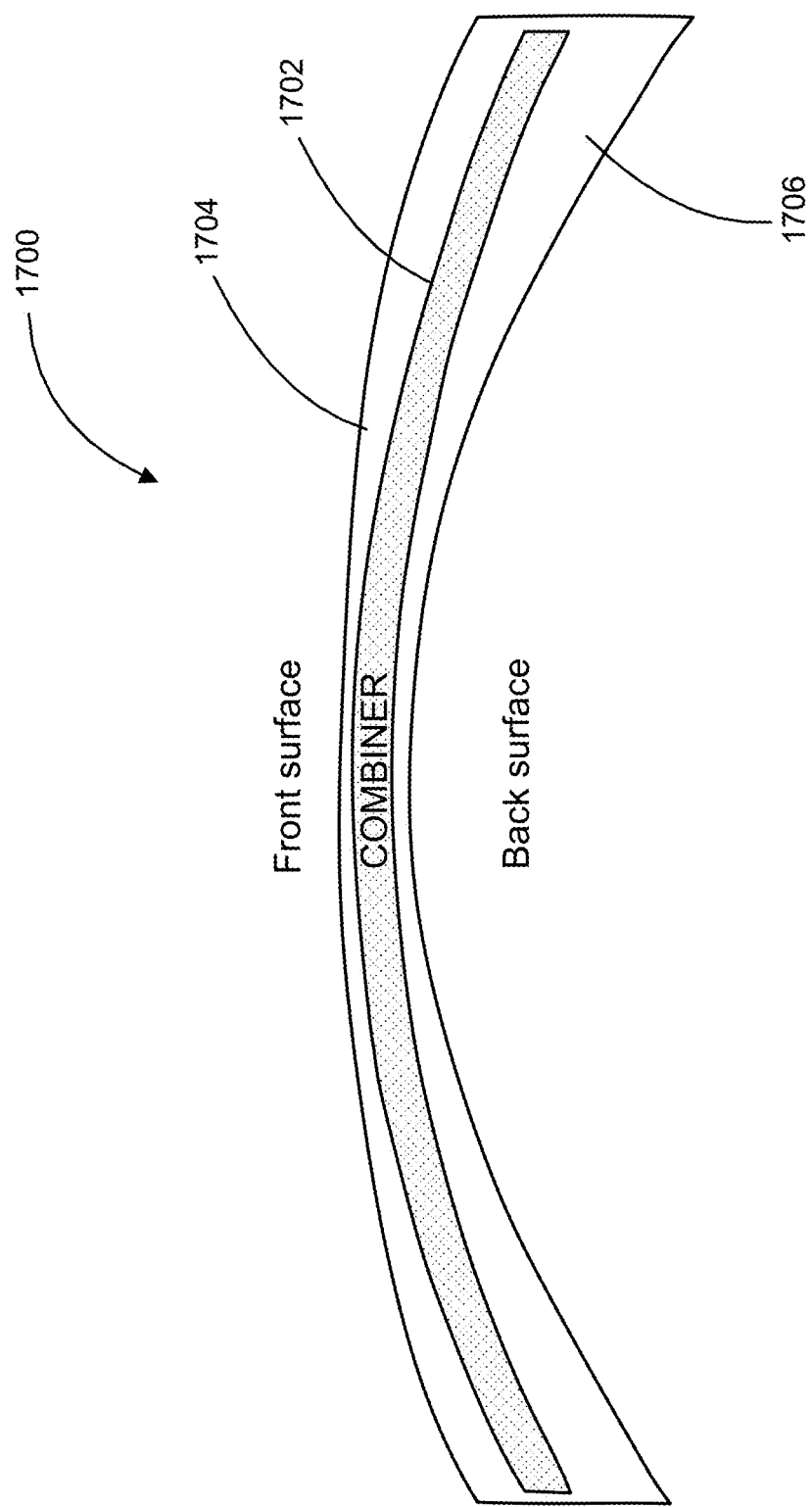
FIG. 17 illustrates the configuration of the comparable example cylindrical configurations of existing ophthalmic lenses for FIG. 15.
Figure 19:
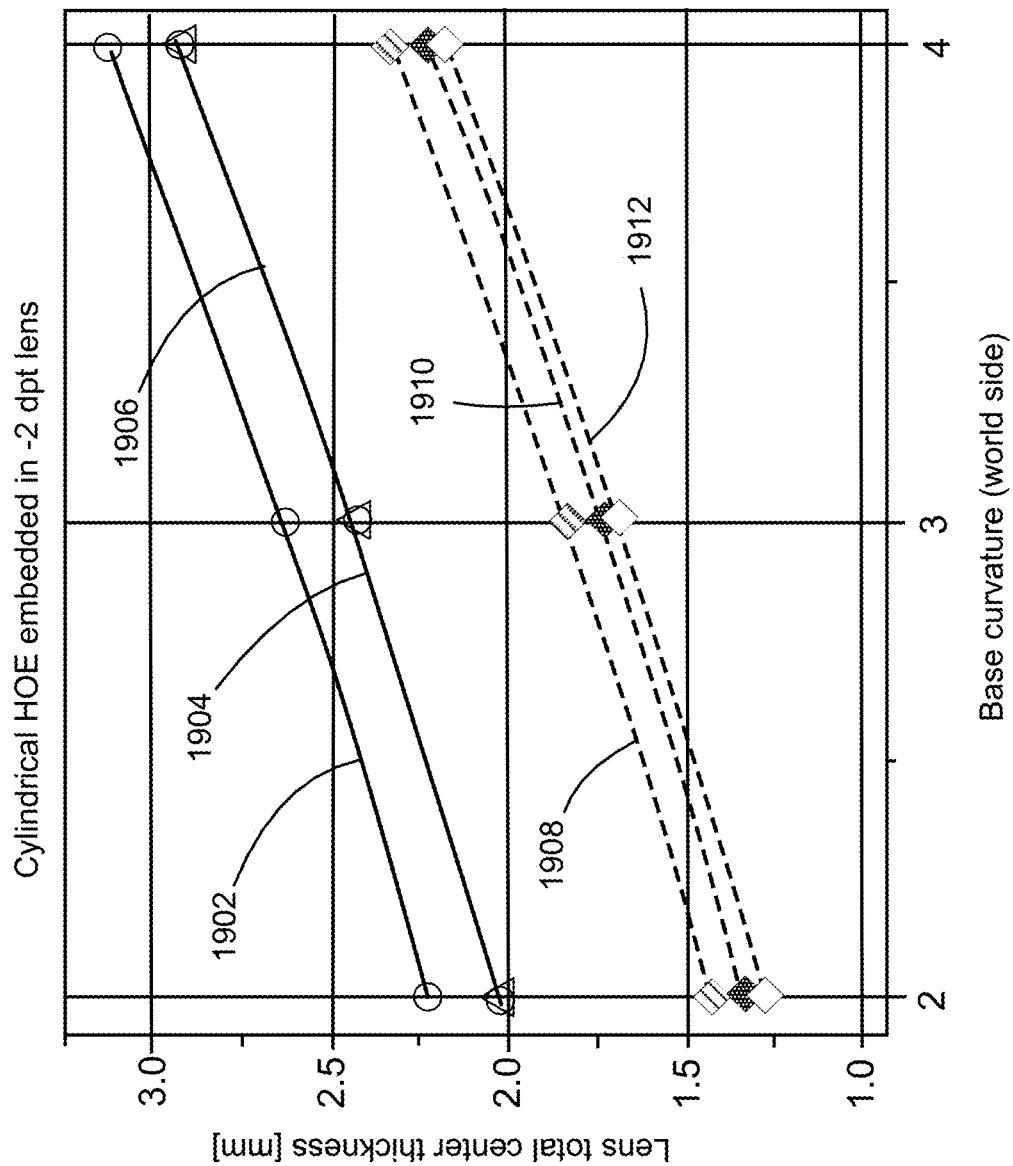
FIG. 19 illustrates total center thicknesses of the example cylindrical configurations of the ophthalmic lens of FIG. 1 and weights of the comparable example cylindrical configurations of the ophthalmic lenses for FIG. 15.

FIG. 15 illustrates weight curves 1502, 1504, 1506, 1508, 1510, 1512 of −2.0 diopter augmented reality ophthalmic lenses in which each include an embedded cylindrical holographic optical element 1502 and has one of three world-side surface base curvatures (2D, 3D, and 4D). The weights curves 1502, 1504, 1506, 1508, 1510, 1512 were determined for the lens outline illustrated in FIG. 16. The embedded cylindrical holographic optical element 1702 is an example of an augmented reality combiner with a cylindrical shape. Other examples of a curved augmented reality combiner include, but are not limited to, a reflective waveguide, a diffractive waveguide, and a free-form waveguide. Weight curves 1502, 1504, 1506 are for the conventional cylindrical lens configuration 1700 in FIG. 17 in which the embedded cylindrical holographic optical element 1702 is embedded between a front half lens 1704 and a rear half lens 1706. Weight curve 1502 corresponds to the half lenses 1704, 1706 being made of Trivex and having a 1.0 mm center thickness for the rear half lens 1706. Weight curve 1704 corresponds to the half lenses 1704, 1706 being made of polycarbonate and having a 0.8 mm center thickness for the rear half lens 1706. Weight curve 1506 corresponds to the half lenses 1704, 1706 being made of Trivex and having a 0.8 mm center thickness for the rear half lens 1506. Weight curves 1502, 1504, 1506 illustrate lower weight limits of conventional configurations of prescription lenses with a functional element (e.g., a switchable tint element, an augmented reality combiner) that are manufactured by grinding and polishing followed by lamination. With conventional configurations of prescription lenses with a functional element, even employing aggressively low minimum thickness for each of the front half lens 1704 and the rear half lens 1706 does not have a large impact on weight. Weight curves 1508, 1510, 1512 are for the cylindrical lens configuration of the ophthalmic lens 10 shown in FIG. 17 in which the embedded cylindrical holographic optical element 1702 is embedded in a curved front lens assembly that is configured similar to curved front lens assembly 12 and includes a curved back lens similar to the curved back lens 14. Weight curve 1508 corresponds to the curved back lens 14 being made of Trivex and having a 0.2 mm center thickness. Weight curve 1510 corresponds to the curved back lens 14 being made of Trivex and having a 0.1 mm center thickness. Weight curve 1512 corresponds to the curved back lens 14 being made of Trivex and having a 0.05 mm center thickness. FIG. 19 illustrates total center thicknesses 1902, 1904, 1906, 1908, 1910, 1912 of the example embodiments of the ophthalmic lenses corresponding to the weight curves 1502, 1504, 1506, 1508, 1510, 1512.

Figure 18:
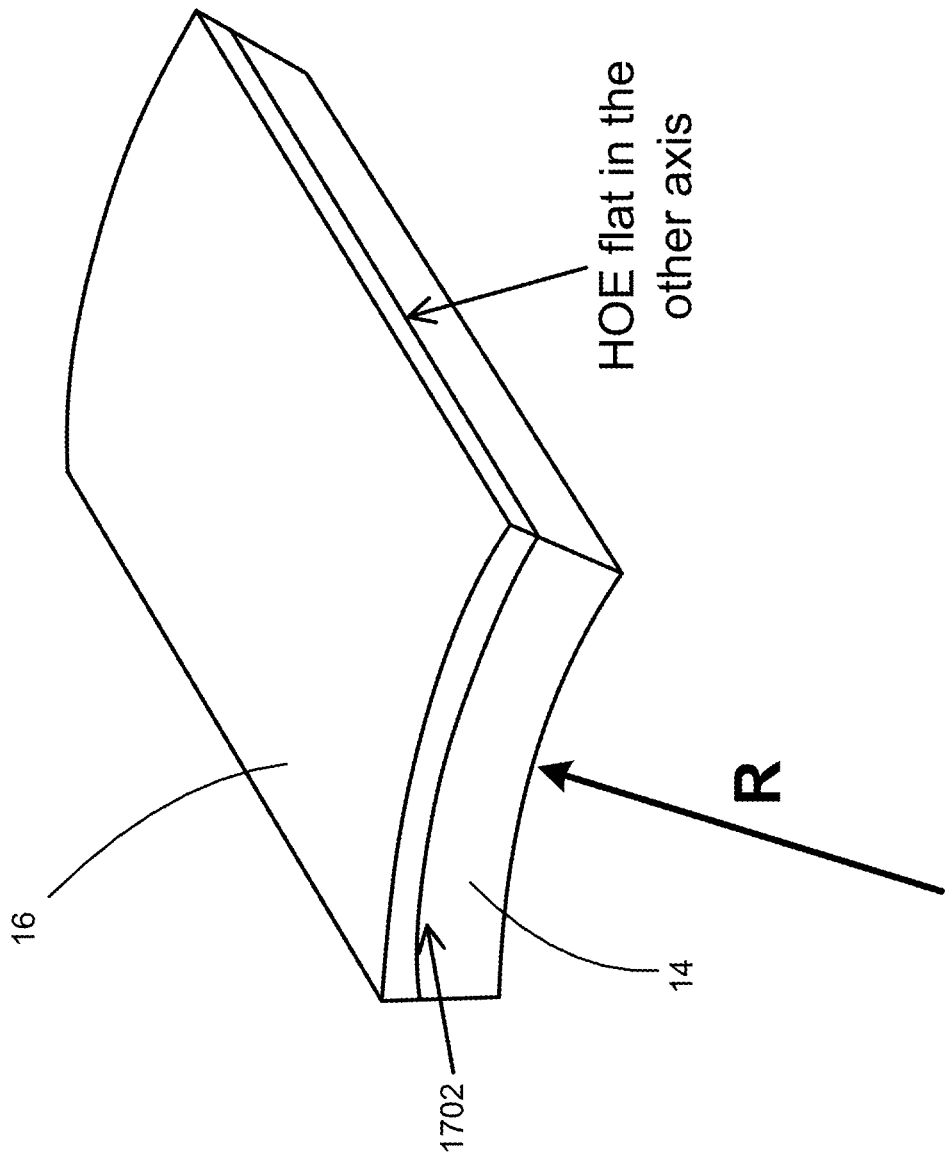
FIG. 18 illustrates the configuration of the example cylindrical configurations of the ophthalmic lens of FIG. 1 for FIG. 15

The weight curves 1502, 1504, 1506, 1508, 1510, 1512 illustrate the weight reductions associated with some primary configurational differences between the conventional augmented reality lens configuration 1700 and the cylindrical lens configuration of the ophthalmic lens 10 shown in FIG. 18. For example, for the 2 diopter lens evaluated, using a 2D world-side surface base curvature instead of a 4D world-side surface base curvature results in about a 1.7 grams weight reduction. Using the ophthalmic lens configuration corresponding to weight curves 1508, 1510, 1512 (corresponding to the configuration illustrated in FIG. 18) instead of the ophthalmic lens configuration corresponding to weight curves 1502, 1504, 1506 (corresponding to the configuration shown in FIG. 17) results in a weight reduction from 1.0 to 1.3 grams. Using a 0.8 mm center thickness instead of a 1.0 mm center thickness for the curved back lens 14 results in a weight reduction of about 0.4 grams. Fabricating the curved back lens 14 from polycarbonate instead of Trivex results in a weight reduction of about 0.1 grams. The impact on weight of world-side surface base curvature was evaluated for the described cylindrical configurations. For spherical configurations of the ophthalmic lens 10, the center thickness for negative meniscus configurations of the curved back lens 14 (which provide a negative diopter vision correction) may be independent of world-side surface base curvature.

Curved Back Lens Printing

The curved back lens 14 can be printed onto the curved front lens assembly 12 using any suitable approach. For example, the curved back lens 14 can be printed using the approaches described below and disclosed in U.S. Pat. No. 10,994,474, the entire contents of which is hereby incorporated herein by reference.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An augmented reality lens comprising:
a front lens assembly consisting essentially of a curved front lens and a curved augmented reality combiner embedded within the curved front lens or attached to the curved front lens, wherein the curved front lens forms an external world-side convex surface of the augmented reality lens, wherein the curved front lens has an essentially constant thickness between 0.8 mm to 1.0 mm and is formed from an impact resistance material so that the curved front lens provides impact resistance satisfying ANSI standards for safety eyewear, wherein the external world-side convex surface has a radius of curvature less than 300 mm, and wherein the curved augmented reality combiner is configured for overlaying virtual image content on a real world scene; and
a curved back lens that forms an external user-side surface of the augmented reality lens, wherein the curved back lens has a world-side convex surface that is shaped complementary to and interfaced with the front lens assembly, wherein the curved back lens provides a prescribed vision correction for a user of the augmented reality lens, and wherein the curved back lens has a minimum thickness location at which the curved back lens has a thickness equal to or less than 0.25 mm.

2. The augmented reality lens of claim 1, wherein:
the curved front lens is formed from one of a molded polycarbonate lens material or a cast urethane-based monomer.

3. The augmented reality lens of claim 1, wherein the curved back lens is (i) a negative meniscus lens configured to provide vision correction for myopia or (ii) is a positive meniscus lens configured to provide vision correction for hyperopia.

4. An ophthalmic lens comprising:
a first lens assembly consisting essentially of a curved front lens and an augmented reality combiner operable to modify an image of a real world scene viewed via the ophthalmic lens, wherein the first lens assembly forms an external world-side convex surface of the ophthalmic lens, and wherein the curved front lens has an essentially constant thickness between 0.8 mm to 1.0 mm and is formed from an impact resistance material so that the curved front lens provides impact resistance satisfying ANSI standards for safety eyewear; and
a curved back lens that forms an external user-side surface of the ophthalmic lens, wherein the curved back lens has a world-side convex surface and provides vision correction for a user of the ophthalmic lens, and wherein the curved back lens has a minimum thickness location at which the curved back lens has a thickness equal to or less than 0.25 mm.

5. The ophthalmic lens of claim 4, wherein:
the curved front lens is formed from one of a molded polycarbonate lens material or a cast urethane-based monomer.

6. The ophthalmic lens of claim 4, wherein the curved back lens is configured as a negative meniscus lens or as a positive meniscus lens.

7. The ophthalmic lens of claim 4, wherein:
the world-side convex surface of the ophthalmic lens has a first radius of curvature of at least 75 mm; and
the world-side convex surface of the ophthalmic lens has a second radius of curvature of equal to or less than 260 mm.

8. The ophthalmic lens of claim 4, wherein the first lens assembly comprises at least one of an optical decoupling material or an adhesive promoter.

9. The ophthalmic lens of claim 4, comprising at least one of a scratch resistant coating, an anti-reflection layer, an anti-fog material, a hydrophobic coating, an oleo phobic coating, or a photochromic coating.

10. An augmented reality device comprising:
an augmented reality lens comprising a first lens assembly and a curved back lens, wherein the first lens assembly consists essentially of a curved front lens and an augmented reality combiner configured for overlaying virtual image content on a real world scene, wherein the first lens assembly forms an external world-side convex surface of the augmented reality lens, wherein the curved front lens has an essentially constant thickness between 0.8 mm to 1.0 mm and is formed from an impact resistance material so that the curved front lens provides impact resistance satisfying ANSI standards for safety eyewear, wherein the curved back lens forms an external user-side surface of the augmented reality lens, wherein the curved back lens provides vision correction for a user of the augmented reality lens, and wherein the curved back lens has a minimum thickness location at which the curved back lens has a thickness equal to or less than 0.25 mm;
a frame assembly that supports the augmented reality lens and is configured to be worn by a user of the augmented reality device; and
electronics mounted to the frame assembly and operable to display the virtual image content via the augmented reality combiner.

11. The augmented reality device of claim 10, wherein:
the curved front lens is formed from one of a molded polycarbonate lens material or a cast urethane-based monomer.

12. The augmented reality device of claim 10, wherein the curved back lens is configured as a negative meniscus lens or as a positive meniscus lens.

13. The augmented reality device of claim 10, wherein:
the external world-side convex surface of the augmented reality lens has a first radius of curvature of at least 75 mm; and
the external world-side convex surface of the augmented reality lens has a second radius of curvature of equal to or less than 260 mm.

14. The augmented reality device of claim 10, wherein the first lens assembly comprises at least one of an optical decoupling material or an adhesive promoter.

15. The augmented reality device of claim 10, comprising at least one of a scratch resistant coating, an anti-reflection layer, an anti-fog material, a hydrophobic coating, an oleo phobic coating, or a photochromic coating.

16. The augmented reality device of claim 13, wherein:
the curved front lens is formed from one of a molded polycarbonate lens material or a cast urethane-based monomer.

* * * * *